(12) United States Patent
Kuroda

(10) Patent No.: US 10,792,839 B2
(45) Date of Patent: Oct. 6, 2020

(54) METHOD AND APPARATUS FOR MANUFACTURING COMPOSITE MATERIAL

(71) Applicant: Nissan Motor Co., Ltd., Yokohama-shi, Kanagawa (JP)

(72) Inventor: Shinichi Kuroda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 169 days.

(21) Appl. No.: 16/097,702

(22) PCT Filed: Jun. 3, 2016

(86) PCT No.: PCT/JP2016/066662
§ 371 (c)(1),
(2) Date: Oct. 30, 2018

(87) PCT Pub. No.: WO2017/208458
PCT Pub. Date: Dec. 7, 2017

(65) Prior Publication Data
US 2019/0134854 A1    May 9, 2019

(51) Int. Cl.
*B29B 11/16* (2006.01)
*B29B 15/10* (2006.01)
(Continued)

(52) U.S. Cl.
CPC ............ *B29B 15/105* (2013.01); *B29B 15/12* (2013.01); *B29C 39/10* (2013.01); *B29C 70/16* (2013.01);
(Continued)

(58) Field of Classification Search
CPC combination set(s) only.
See application file for complete search history.

(56) References Cited

U.S. PATENT DOCUMENTS 4,988,469 A * 1/1991 Reavely ................ B29B 11/14
264/113
5,071,711 A * 12/1991 Heck ..................... B29B 15/105
264/135
(Continued)

FOREIGN PATENT DOCUMENTS

EP    3 348 371 A1    7/2018
EP    3 348 378 A1    7/2018
(Continued)

*Primary Examiner* — Michael A Tolin
(74) *Attorney, Agent, or Firm* — Global IP Counselors, LLP

(57) ABSTRACT

According to a manufacturing method and device for manufacturing a composite material having reinforced base materials with a resin impregnated in the reinforced base materials. An unactivated powdered adhesive is applied to at least one surface of a plurality of carbon fiber sheets. The carbon fiber sheets are laminated to form a laminate. At least a portion of the unactivated powdered adhesive that is applied between layers of the laminate is removed using an airflow that flows from one exterior surface of the laminate to an opposite exterior surface of the laminate to form a preform having a first region in which the activated adhesive is impregnated in the laminate, and a second region in which a content density of the activated adhesive is less than that in the first region.

14 Claims, 17 Drawing Sheets

(51) Int. Cl.
  *B29C 70/48* (2006.01)
  *B32B 37/12* (2006.01)
  *C08J 5/04* (2006.01)
  *B29C 39/10* (2006.01)
  *B29C 70/22* (2006.01)
  *B29C 70/86* (2006.01)
  *B29C 70/54* (2006.01)
  *B29B 15/12* (2006.01)
  *B29C 70/50* (2006.01)
  *B29C 70/16* (2006.01)
  *B29C 70/70* (2006.01)
  *B29C 70/46* (2006.01)
  *B29K 63/00* (2006.01)
  *B29K 307/04* (2006.01)
  *B29L 31/30* (2006.01)

(52) U.S. Cl.
  CPC ............ *B29C 70/222* (2013.01); *B29C 70/48* (2013.01); *B29C 70/50* (2013.01); *B29C 70/545* (2013.01); *B29C 70/546* (2013.01); *B29C 70/70* (2013.01); *B29C 70/865* (2013.01); *B32B 37/12* (2013.01); *B32B 37/1207* (2013.01); *C08J 5/04* (2013.01); *B29B 11/16* (2013.01); *B29C 70/46* (2013.01); *B29C 2793/0081* (2013.01); *B29K 2063/00* (2013.01); *B29K 2307/04* (2013.01); *B29K 2715/003* (2013.01); *B29L 2031/3055* (2013.01); *B32B 2037/1238* (2013.01); *B32B 2605/08* (2013.01); *C08J 5/042* (2013.01)

(56) References Cited

U.S. PATENT DOCUMENTS

| 5,080,851 | A | * | 1/1992 | Flonc | B29B 11/16 156/222 |
| 6,447,705 | B1 | * | 9/2002 | Fowler | B29C 70/345 264/129 |
| 2017/0106608 | A1 | * | 4/2017 | Chujo | B29C 70/48 |
| 2017/0335079 | A1 | * | 11/2017 | Polus | B29C 70/543 |

FOREIGN PATENT DOCUMENTS

| JP | 2006256202 A | * | 9/2006 |
| JP | 2007126793 A | * | 5/2007 |
| JP | 2007276453 A | * | 10/2007 |
| JP | 2011-168009 A | | 9/2011 |

* cited by examiner

METHOD AND APPARATUS FOR MANUFACTURING COMPOSITE MATERIAL

CROSS-REFERENCE TO RELATED APPLICATIONS

This application is a U.S. national stage application of International Application No. PCT/JP2016/066662, filed on Jun. 3, 2016.

BACKGROUND

Field of the Invention

The present invention relates to a method and device for manufacturing a composite material.

Background Information

In recent years, composite materials made by impregnating a reinforced base material with resin have been used as automobile parts to reduce automobile body weight. An RTM (Resin Transfer Molding) molding method, which is suitable for mass production, is attracting attention as a molding method for composite materials. In the RTM molding method, first, a reinforced base material is placed inside a molding die, the reinforced base material is impregnated with a resin, and the resin is cured, thereby forming a composite material.

Before being placed into the molding die, the reinforced base material is laminated and subjected to preliminary molding to mold a preform to predetermined shape. In one example of a preform molding method, such as that of Japanese Laid-Open Patent Application No. 2011-168009 (Patent Document 1), an adhesive is applied to the entire surface of a sheet-shaped reinforced base material and the reinforced base material is placed in a preforming mold and pressed to mold the preform.

SUMMARY

In recent years, with regard to composite material manufacturing technology, there has been a demand for the realization of manufacturing techniques with which it is possible to mold the preform without generating wrinkles or kinks and to form composite materials in a relatively short period of time by facilitating resin impregnation irrespective of the portion of the preform. However, in processes in which the adhesive is applied to the entire surface of the reinforced base material, as disclosed in Patent Document 1, it is not possible to meet the above-described demand.

As a result of intensive research in order to meet the above-described demand, the present inventor found that by using an unactivated powdered adhesive, it is possible to easily provide, in the preform, a region having a different content density of the activated adhesive, thereby realizing the present invention.

Thus, an object of the present invention is to provide a manufacturing technique with which it is possible to mold the preform without generating wrinkles or kinks and to form composite materials in a relatively short period of time by facilitating the impregnation of resin irrespective of the portion of the preform, by using the unactivated powdered adhesive.

A manufacturing method for a composite material according to the present invention which realizes the object described above is a method for the manufacture of a composite material comprising a reinforced base material and a resin impregnated in the reinforced base material. An unactivated powdered adhesive is applied to at least one of the surfaces of a plurality of the reinforced base material sheets, and the reinforced base material sheets are laminated to form a laminate. A portion of the powdered adhesive that is applied between the layers of the laminate is removed by means of an airflow that flows with respect to the laminate in the lamination direction of the reinforced base material from one surface to the other surface to form a first portion in which the powdered adhesive is applied between the layers of the laminate and a second portion in which the applied density of the powdered adhesive is less than that of the first portion. The powdered adhesive is activated, and a preform having a first region in which the activated adhesive is impregnated in the laminate and a second region in which the content density of the adhesive is less than in the first region, is formed.

A manufacturing device for a composite material according to the present invention which achieves the object described above comprises an application unit for applying an unactivated powdered adhesive onto a plurality of sheet-like reinforced base materials; a lamination unit for laminating the reinforced base materials to form a laminate; a removal unit for removing the powdered adhesive that is applied between layers of the laminate by means of an airflow that flows with respect to the laminate in the lamination direction of the reinforced base material from one surface to the other surface; a heating unit for activating the powdered adhesive; a preforming mold for preforming the reinforced base material into a predetermined shape; and a control unit for controlling operations of the removal unit and the heating unit. The control unit controls the operation of the removal unit to remove the portion of the powdered adhesive that is applied between the layers of the laminate to thereby form the first portion, in which the powdered adhesive is applied between the layers of the laminate, and the second portion, in which the applied density of the powdered adhesive is less than that of the first portion. Furthermore, the control unit controls the operation of the heating unit to activate the powdered adhesive, and to form the preform having the first region, in which the activated adhesive is impregnated in the laminate, and the second region, in which the content density of the adhesive is less than that of the first region.

BRIEF DESCRIPTION OF THE DRAWINGS

FIGS. 2A and 2B are schematic perspective views for explaining the configuration of each part of a preforming device for molding a preform according to the first embodiment in which FIG. 2A shows a conveyance unit, an application unit, and a lamination unit, and FIG. 2B shows a removal unit and a restraining fixture.

FIGS. 3A, 3B and 3C are views for explaining the actions of the removal unit and the restraining fixture according to the first embodiment in which FIG. 3A illustrates a state in which a laminate is restrained, FIG. 3B illustrates a state in which a portion of the laminate is heated, and FIG. 3C illustrates a state in which a powdered adhesive that is between layers of the stacked laminate is removed.

FIGS. 4A and 4B are views for explaining the configuration of each part of the preforming device for molding the preform according to the first embodiment in which FIG. 4A illustrates the configuration of a cutting unit, and FIG. 4B illustrates a vicinity of a cutting line that is cut by the cutting unit.

FIGS. 5A and 5B are views is a view for explaining the configuration of each part of a preforming device for molding the preform according to the first embodiment in which FIG. 5A is a schematic perspective view of a reheating unit, and FIG. 5B is a schematic perspective view of the preforming device.

FIGS. 8A and 8B are views is a view illustrating an application example of the composite material manufactured by the manufacturing method and the manufacturing device according to the first embodiment in which FIG. 8A illustrates a view illustrating various automobile parts that use the composite material, and FIG. 8B illustrates a view illustrating a vehicle body formed by joining the automobile parts.

FIGS. 11A and 11B are views is a conceptual view for explaining a principle of a modified example of the first embodiment and a view of a state in which resin flows in a molding die in which the reinforced base material is placed as seen from a direction of a top surface in which FIG. 11A illustrates a view of a state in which resin is injected in the preform according to the modified example of the first embodiment, and FIG. 11B illustrates a view illustrating the state in which the resin is injected in the preform according to a comparative example.

FIGS. 15A and 4B are views explaining the actions of the removal unit and the restraining fixture according to the second embodiment in which FIG. 15A illustrates a state in which the laminate is restrained.

FIGS. 16A and 16B are views for explaining the actions of the removal unit and the restraining fixture according to the second embodiment in which FIG. 16A illustrates a state in which the powdered adhesive has been removed from between the layers of the stacked body, and FIG. 16B illustrates a state in which the plate-shaped member has been pulled out from between the layers of the laminate.

DETAILED DESCRIPTION OF THE EMBODIMENTS

Figure 1:
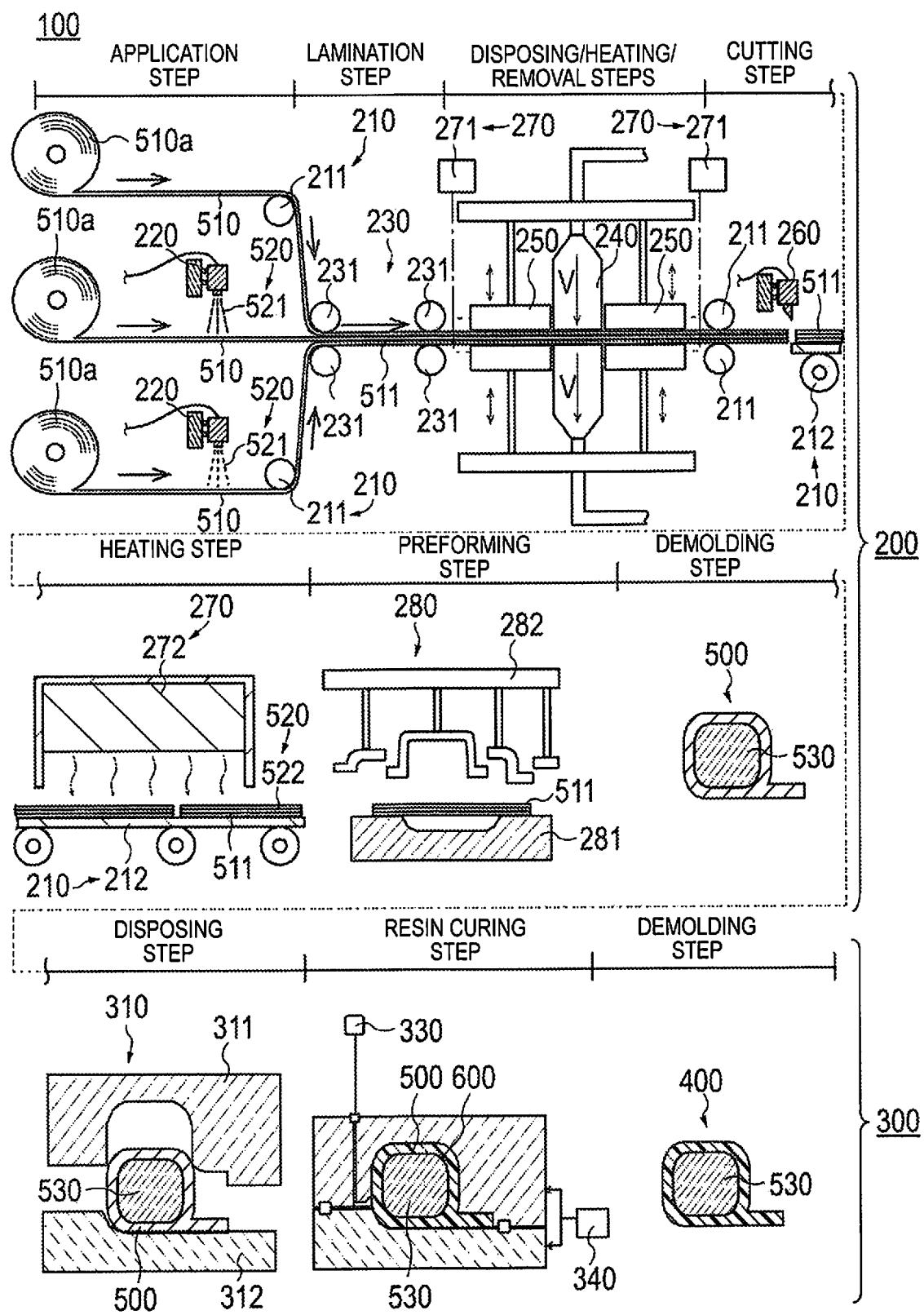
FIG. 1 is a schematic view for explaining an overall flow of a manufacturing device and a manufacturing method for a composite material according to a first embodiment.

Embodiments of the present invention will be explained below with reference to the appended drawings. The description below does not limit the technical scope or the meanings of the terms described in Claims. Dimensional ratios in the drawings are exaggerated for the sake of convenience of explanation and may differ from actual ratios.

First Embodiment

The first embodiment according to the present invention will be described below with reference to FIGS. 1 to 10.

Figure 6A:
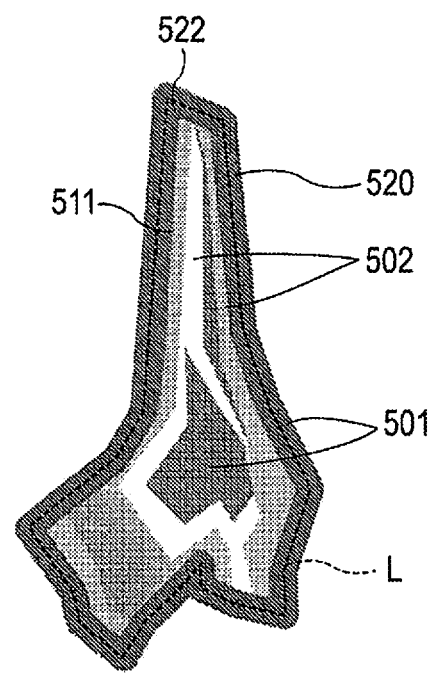
FIG. 6A is a view illustrating a content density distribution of an adhesive in a reinforced base material.
Figure 6B:
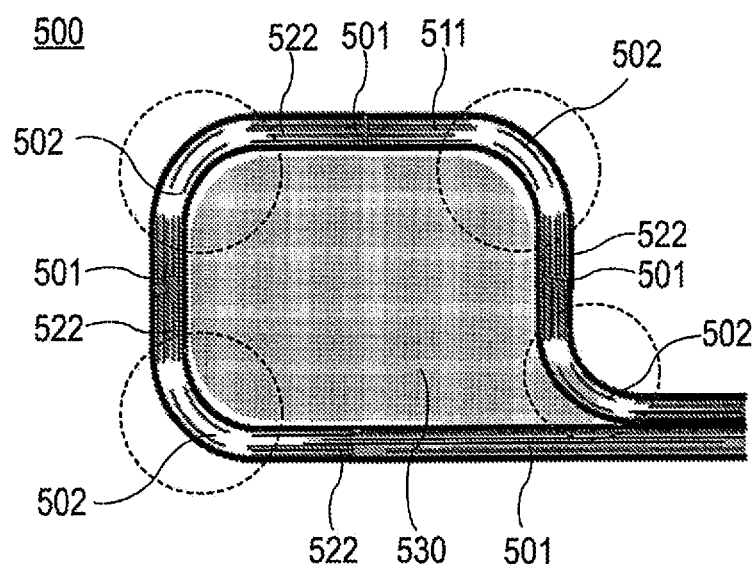
FIG. 6B is a view illustrating the content density distribution of the adhesive in the preform that has been preformed.
Figure 7:
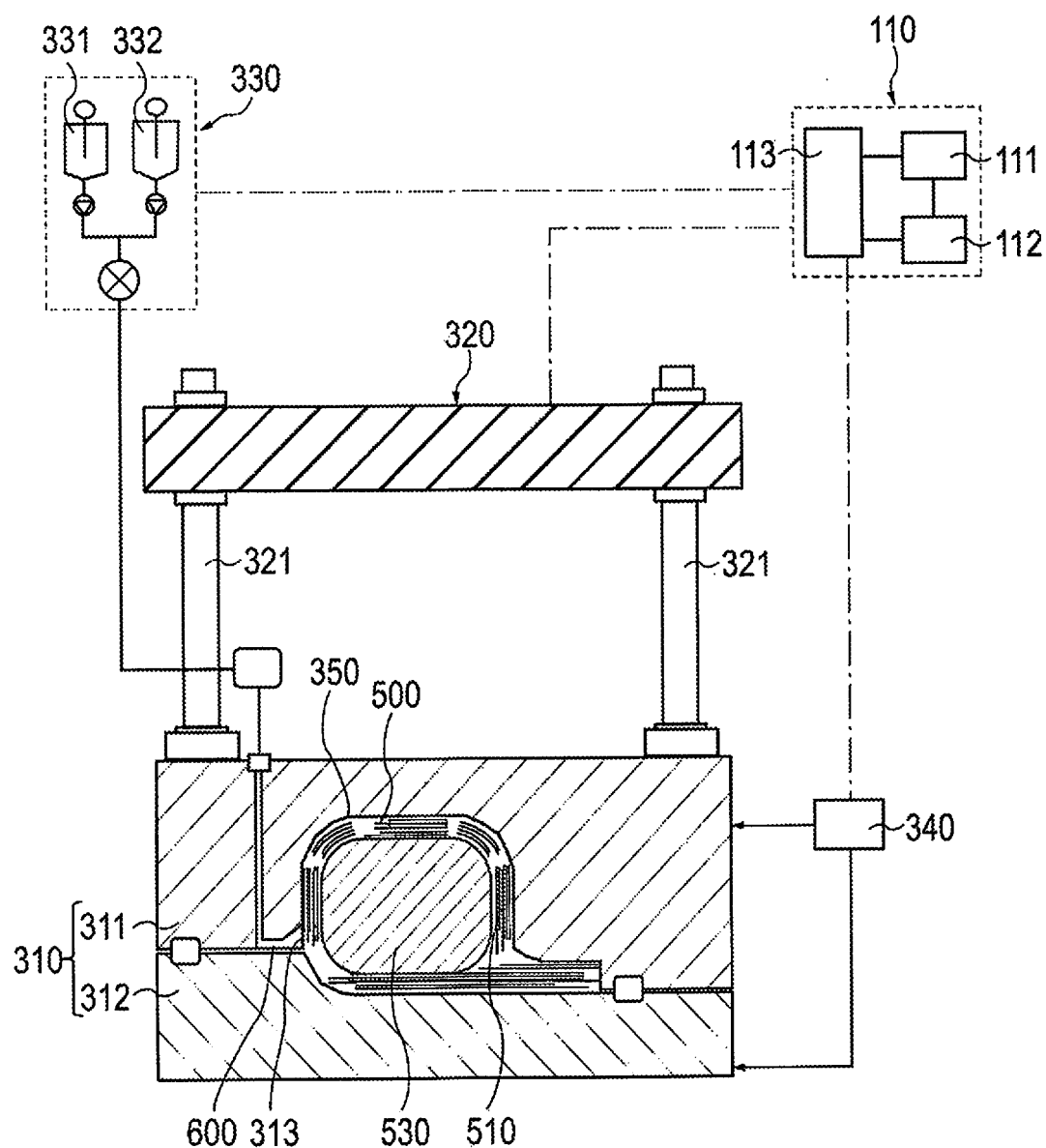
FIG. 7 is a schematic view of a composite material forming device for forming the composite material using the preform according to the first embodiment.
Figure 8A:
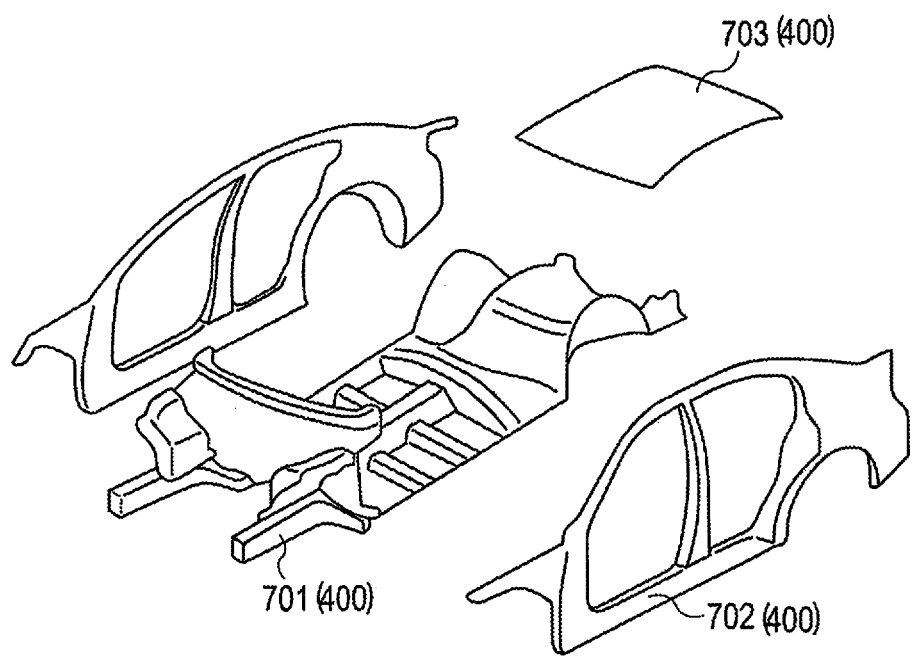
Figure 8B:
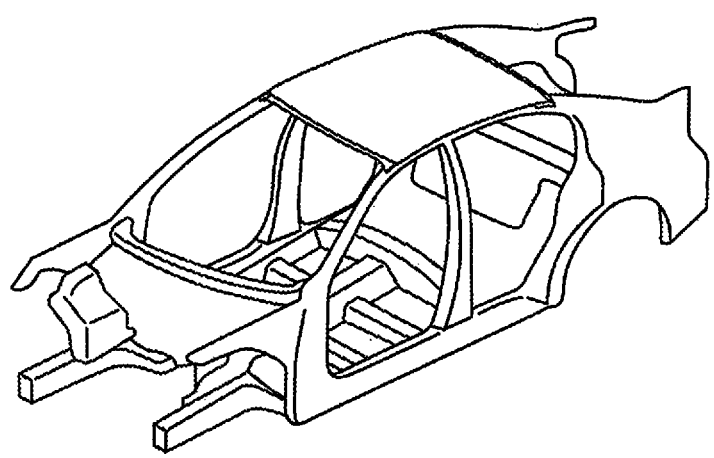
Figure 9:
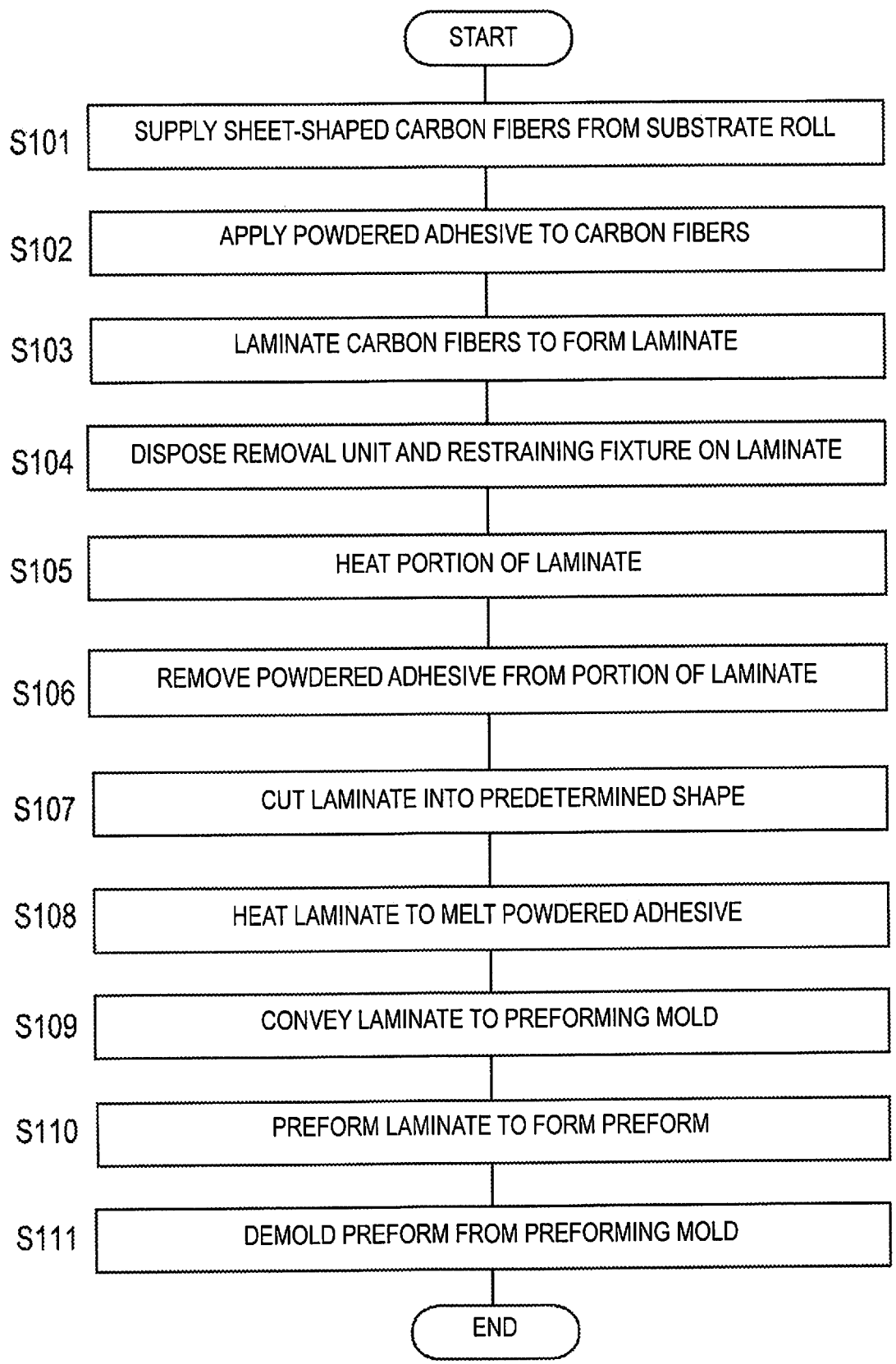
FIG. 9 is a flowchart illustrating a molding method for the preform according to the first embodiment.
Figure 10:
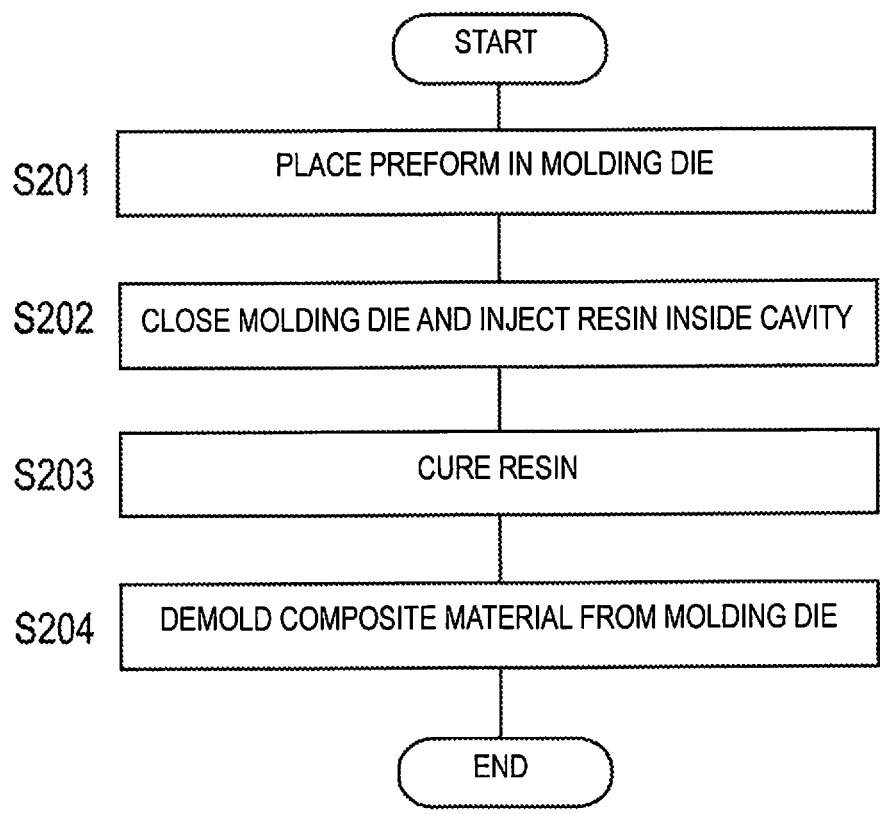
FIG. 10 is a flowchart illustrating the molding method for the composite material according to the first embodiment.

FIG. 1 is a view for explaining an overall flow of a manufacturing device 100 and a manufacturing method for a composite material 400 according to the first embodiment. FIGS. 2, 4, and 5 are view for explaining a configuration of each part of a preforming device 200 for molding a preform 500 according to the first embodiment. FIG. 3 is a view for explaining the actions of a removal unit 240 and a restraining fixture 250 according to the first embodiment. FIG. 6A is a view illustrating a content density distribution of an adhesive 520 in a reinforced base material 510, and FIG. 6B is a view illustrating the content density distribution of the adhesive 520 in the preform 500 that has been premolded. FIG. 7 is a schematic view of a composite material forming device 300 for forming the composite material 400 using the preform 500 according to the first embodiment. FIG. 8 is a view illustrating an application example of the composite material 400 manufactured by the manufacturing method and the manufacturing device 100 according to the first embodiment. FIG. 9 is a flowchart illustrating a molding method for the preform 500 according to the first embodiment. FIG. 10 is a flowchart illustrating the molding method for the composite material 400 according to the first embodiment.

The composite material 400 that is manufactured according to the manufacturing method and the manufacturing device 100 of the present embodiment is formed by impregnating, with resin 600, the preform 500 obtained by preforming a reinforced base material 510 into a predetermined shape, and curing the preform. First, the preform 500 according to the present embodiment will be described.

The preform 500 according to the present embodiment is formed by impregnating, with an adhesive 520, a laminate 511 obtained by laminating the reinforced base materials 510, and preforming the laminate into a predetermined shape, as illustrated at the top and middle of FIG. 1.

The reinforced base material 510 can be formed from, for example, carbon fiber, glass fiber, aramid fiber, polyamide (PA) fiber, polypropylene (PP) fiber, and acrylic fiber. In the present embodiment, an example in which carbon fiber is used as the reinforced base material 510 will be described. Carbon fiber is characterized by a low coefficient of thermal expansion, excellent dimensional stability, and little degradation of mechanical properties even under high temperatures, and thus is suitably used as the reinforced base material of the composite material 400 for an automobile vehicle body 700 (refer to FIG. 8B), and the like.

The basis weight of the carbon fiber 510 can be, for example, 50-400 $g/m^2$, and is preferably 150 $g/m^2$.

The laminate 511 is formed by laminating the carbon fiber sheets 510. For example, the carbon fiber sheets 510 made of a UD (one direction) material, in which fibers are aligned in one direction, or a so-called NCF (non-crimped fabric) material, etc., in which a plurality of sheets, in which fibers are aligned in one direction, are respectively stacked in different directions and integrated using auxiliary fibers, can be used as the laminate 511.

Although the laminated structure depends on the material characteristics required of the composite material 400 as a molded article, lamination is generally carried out so as to have a plurality of orientation angles. In the present embodiment, the laminated structure is such that three types of materials are laminated, the NCF material in which the fiber orientation is ±45°, the UD material in which the fiber orientation is 90°, and the UD material in which the fiber orientation is 0°.

The adhesive 520 is in the form of a powder (solid) in the unactivated state and becomes activated upon melting or softening by means of applied heat. In the present Specification, the adhesive 520 in the form of an unactivated powder is referred to as "powdered adhesive 521," and the adhesive 520 once activated is referred to as "adhesive 522." In addition, reference to "adhesive 520" may mean either the powdered adhesive 521 or the adhesive 522 or both.

The powdered adhesive 521 is applied to the carbon fibers 510 and is melted or softened by means of heating to become the activated adhesive 522. The activated adhesive 522 bonds the carbon fibers 510 together. As a result, when the laminate 511 of the carbon fibers 510 is formed into the desired shape, the adhesive plays the role of maintaining the shape. It is also possible to suppress variations in the arrangement of the carbon fibers 510 when the laminate 511 is conveyed.

The material that constitutes the adhesive 520 is not particularly limited as long as changes of state such as melting and solidification occur in the material due to temperature change, examples of which include low molecular weight epoxy resin, polyamide (PA) resin, polypropylene (PP) resin, and polyethylene (PE) resin. In the present embodiment, a low molecular weight epoxy resin, which is the same epoxy resin as a resin 600 that is used in the composite material 400, described further below, that has low melt viscosity, and thus high flowability, as well as excellent heat resistance and moisture resistance is used. The low molecular weight epoxy resin is not particularly limited as long as the resin has a viscosity that is low enough to allow impregnation in the carbon fibers 510 before curing, and a well-known low molecular weight epoxy resin may be used.

The preform 500 has first regions 501 in which the activated adhesive 522 is impregnated in the laminate 511 and second regions 502, in which the content density of the adhesive 522 is less than that of the first regions 501, as illustrated in FIG. 6B. In the present Specification, "content density of the adhesive 522 is lower" includes a state in which the content density of the adhesive 522 is 0 (zero).

According to the preform 500 described above, by preforming the preform such that curvatures in the second regions 502 become greater than those in the first regions 501, the adhesive force that is applied between the carbon fibers 510 is weaker in the second regions 502, in which the content density of the adhesive 522 is lower, compared to the first regions 501, and thus deformation in this region takes place relatively more readily. Thus, it is possible to suppress the generation of wrinkles, kinks, and the like, which occur particularly in portions with large curvatures, during molding of the preform 500.

Next, the composite material 400 that is manufactured by the manufacturing method and the manufacturing device 100 according to the present embodiment will be described.

By combining the carbon fibers 510 with the resin 600, the composite material 400 will have greater strength and rigidity compared to a molded article composed of only the resin 600. For example, the composite material 400 can be applied to a frame component such as a front side member 701 or a pillar 702, or an outer panel component such as a roof 703, which are used in the vehicle body 700 of an automobile, such as those illustrated in FIG. 8A. Because the composite material 400 is lighter than steel materials, it is possible to reduce the weight of the vehicle body 700, such as illustrated in FIG. 8B, compared to a vehicle body formed by assembling parts that are made of steel materials.

The composite material 400 according to the present embodiment is formed by impregnating the preform 500 with the resin 600. In addition, in the present embodiment, a core material 530, such as that shown at the bottom of FIG. 1 and FIG. 6B, is inserted into the composite material 400 in order to improve the rigidity.

A thermosetting resin such as epoxy resin or phenol resin is used as the resin 600. In the present embodiment, an epoxy resin that has excellent mechanical properties and dimensional stability is used. The epoxy resin typically used is a two-component type, which is used by mixing a main agent and a curing agent. Generally, a bisphenol A type epoxy resin is used as the main agent and an amine type is used as the curing agent, but no limitation is imposed thereby, and the agents may be appropriately selected according to the desired material properties. In addition, an internal mold releasing agent is contained in the resin 600 so as to facilitate demolding after the composite material 400 is molded. The type of the internal mold releasing agent is not particularly limited, and a well-known agent may be used.

The core material 530 is formed inside the composite material 400 by coating with the carbon fibers 510 and impregnating the carbon fibers 510 with the resin 600. The material that constitutes the core material 530 is not particularly limited, but a foam (foam core) is preferably used from the standpoint of weight reduction. Examples of the material constituting the foam include polyurethane, vinyl chloride, polyolefin, acrylic resin, polyimide resin (PMI (polymethacrylimide), and PEI (polyetherimide)).

The manufacturing device 100 for the composite material 400 will be described with reference to FIGS. 1 to 6. The manufacturing device 100 for the composite material 400 according to the present embodiment is roughly divided into the preforming device 200 for molding the preform 500 illustrated at the top and middle of FIG. 1; and the composite material forming device 300 for forming the composite material 400 using the preform 500 illustrated at the bottom in FIG. 1. In addition, the manufacturing device 100 for the composite material 400 has a control unit 110 for controlling the operation of the entire manufacturing device 100 (refer to FIGS. 2, 4A, 5A, and 7).

First, the preforming device 200 for molding the preform 500 will be described.

In the overview illustrated at the top and middle of FIG. 1, the preforming device 200 comprises a conveyance unit 210 for conveying the carbon fibers 510, an application unit 220 for applying the powdered adhesive 521, and a lamination unit 230 for forming the laminate 511. The preforming device 200 further comprises the removal unit 240 for removing the powdered adhesive 521, the restraining fixture 250 that restrains a portion of the laminate 511, a cutting unit 260, a heating unit 270, and a preforming mold 280.

The conveyance unit 210 continuously conveys the carbon fibers 510 to the application unit 220, the lamination unit 230, the removal unit 240, the restraining fixture 250, the cutting unit 260, the heating unit 270, and the preforming mold 280, as illustrated at the top and middle of FIG. 1. The conveyance unit 210 includes a plurality of conveyance rollers 211 and a belt conveyor 212. In the present Specification, the upstream position side along the flow of the conveyance direction of the carbon fibers 510 indicated by the arrow in FIG. 1 is referred to as the upstream side, and the downstream position side is referred to as the downstream side.

Figure 2A:
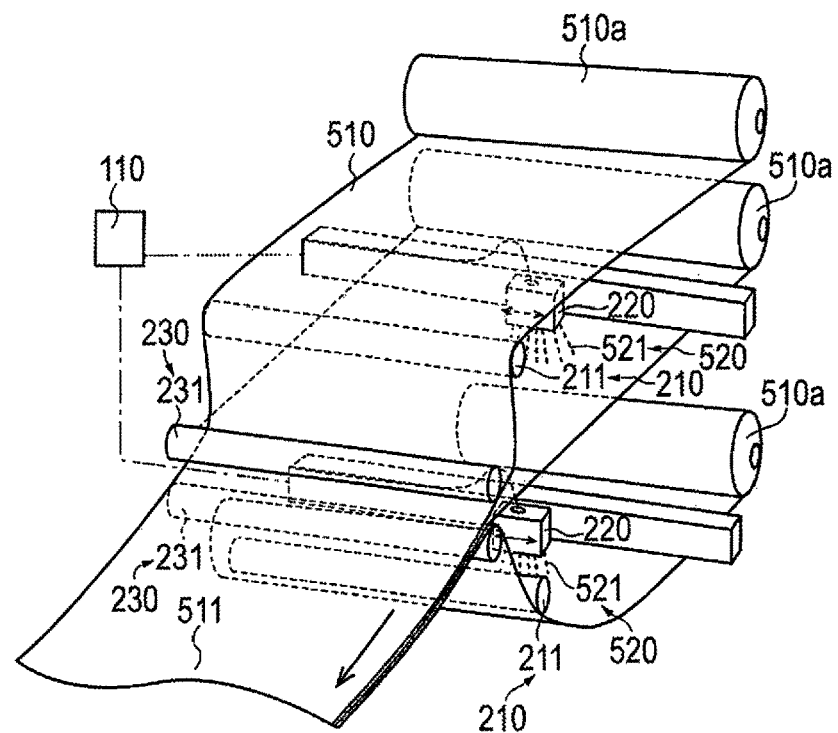

As illustrated at the top of FIG. 1 and FIG. 2A, the conveyance rollers 211 have a substantially cylindrical shape and are connected to motors or the like and are rotationally driven around shafts. The conveyance rollers 211 convey carbon fiber sheets 510, which are supplied from wound substrate rolls 510a, to the downstream side (direction of the arrow in FIG. 2A).

Figure 4A:
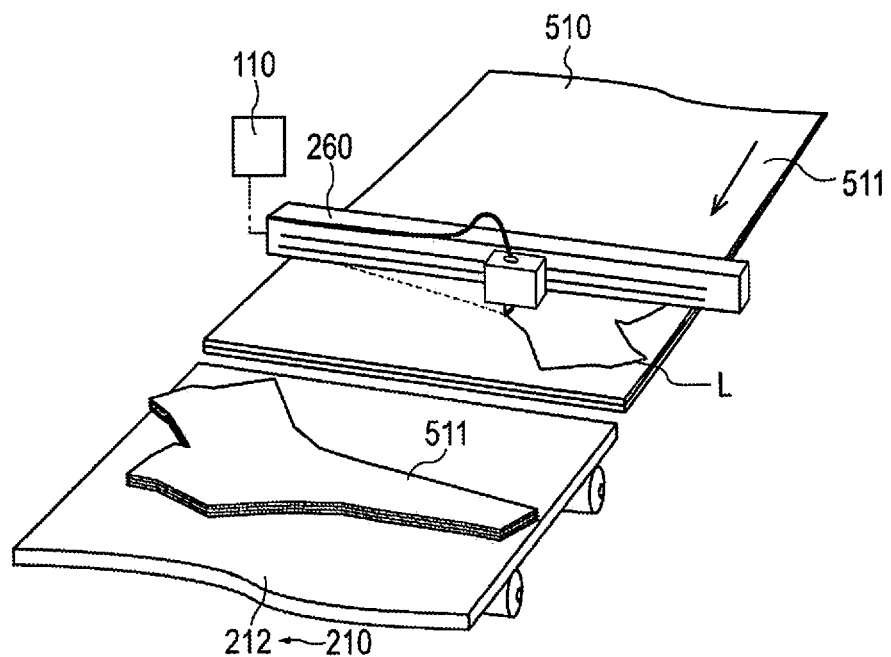
Figure 5A:
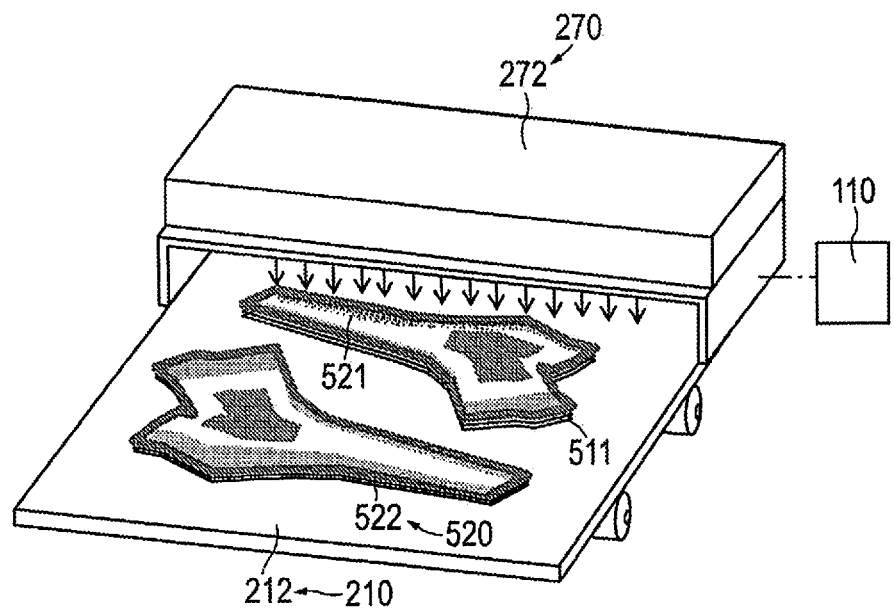

The belt conveyor 212 conveys the laminate 511 that has been cut by the cutting unit 260 to the heating unit 270, as illustrated in the middle of FIG. 1 as well as FIGS. 4A and 5A. The belt conveyor 212 is provided in accordance with the arrangement of the cutting unit 260 and the heating unit 270 and is configured such that it is possible to continuously carry out operations along the conveyance path.

The conveyance unit 210 is not limited to the configuration described above and can be composed of, for example, a conveyance robot instead of the belt conveyor 212.

The application unit 220 is configured to be movable in a planar direction of the carbon fiber sheets 510, as illustrated in FIG. 2A. The application unit 220 applies the powdered adhesive 521 to the carbon fibers 510 that are continuously fed from the upstream side of the conveyance unit 210 essentially uniformly. The application amount of the powdered adhesive 521 depends on the type and the physical properties of the adhesive 520 that is used, but may be, for example, 10-100 g/m³.

The application unit 220 is not particularly limited as long as it is possible to apply the powdered adhesive 521 to the carbon fibers 510 therewith, and, for example, a screen printing apparatus that has high mass producibility and high application precision may be used. The screen printing apparatus sprays the powdered adhesive 521 as a mist, which is directly blown and applied to the carbon fibers 510 essentially uniformly, as illustrated in FIG. 2A.

The lamination unit 230 is provided along the conveyance path of the carbon fibers 510 and is composed of a plurality of laminating rollers 231 that oppose each other across the carbon fibers 510, as illustrated at the top of FIG. 1 and in FIG. 2A. The laminating rollers 231 laminate, and feed to the downstream side, the plurality of the carbon fiber sheets 510 that are conveyed from the conveyance rollers 211, by rotating while pressing against the carbon fibers 510. The laminating rollers 231 can be configured in the same manner as the conveyance rollers 211 described above.

The numbers, arrangements, etc., of the conveyance rollers 211 and the laminating rollers 231 that are provided in the preforming device 200 are not limited to the example shown in FIG. 1 and may be appropriately changed.

Figure 2B:
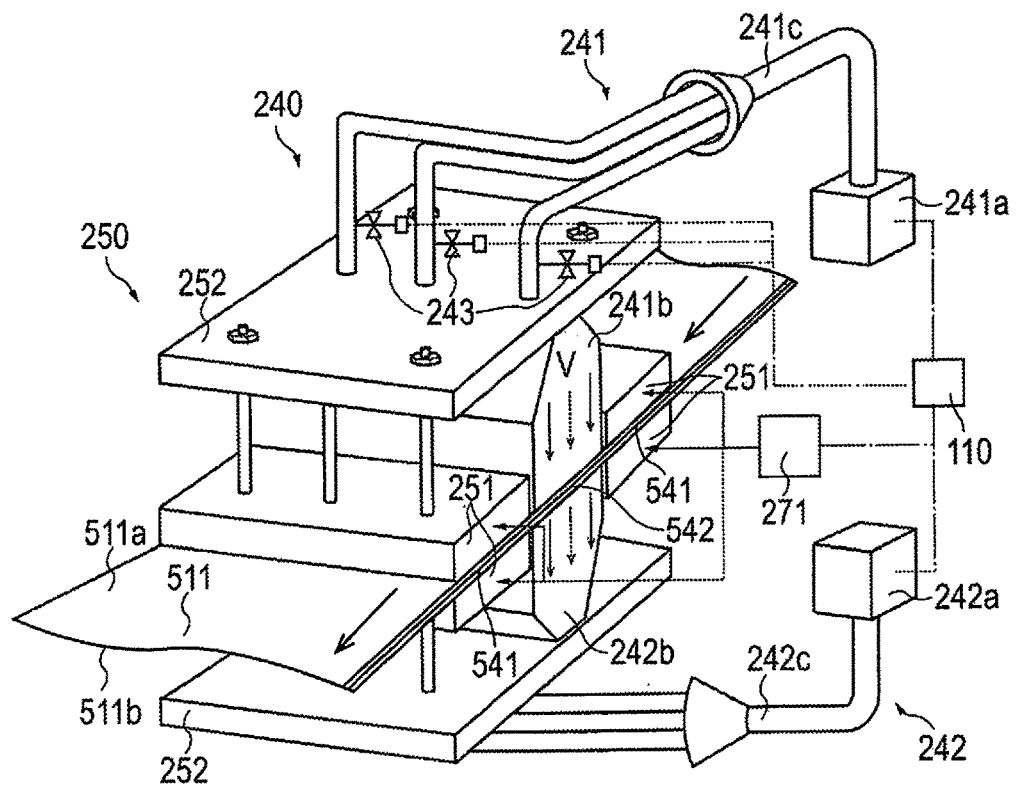

The removal unit 240 removes a portion of the powdered adhesive 521 that is applied between the layers of the laminate 511 by generating an airflow V that flows from one surface 511a to the other surface 511b in a lamination direction of the carbon fibers 510 with respect to the laminate 511 to form an applied density distribution of the powdered adhesive 521, as illustrated in FIG. 2B. In the present Specification, in the applied density distribution of the powdered adhesive 521, the portion where the applied density of the powdered adhesive 521 is relatively high is referred to as a "first portion 541," and the portion where the applied density of the powdered adhesive 521 is lower than the first portion 541 is referred to as a "second portion 542".

The removal unit 240 comprises an air blowing unit 241 that is disposed facing the one surface 511a of the laminate 511, and an air intake unit 242 that is disposed facing the other surface 511b of the laminate 511. The air blowing unit 241 and the air intake unit 242 face each other across the laminate 511.

Figure 3A:
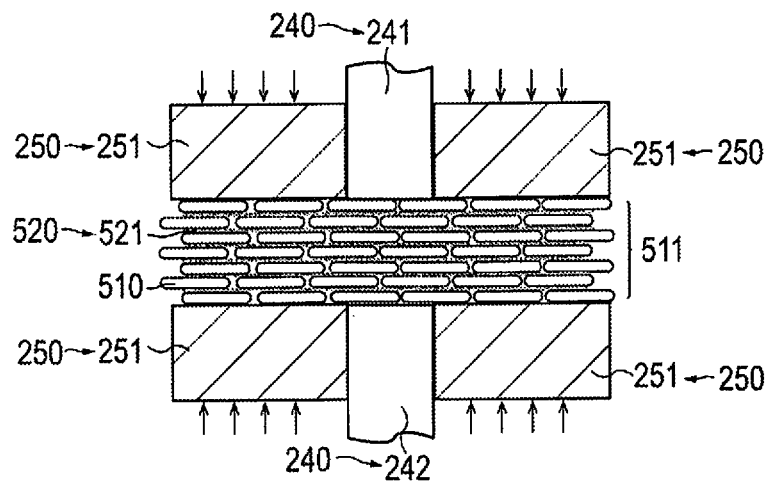

The air blowing unit 241 injects gas onto the one surface 511a of the laminate 511. The air intake unit 242 suctions the gas from the other surface 511b of the laminate 511. Thus, the removal unit 240 generates the airflow V that flows from the one surface 511a to the other surface 511b of the laminate 511. The airflow V discharges a portion of the powdered adhesive 521 to the outside of the laminate 511 from between the layers of the laminate 511, as illustrated in FIG. 3C.

The air blowing unit 241 includes a gas supply part 241a that supplies a gas, an injection nozzle 241b that injects the gas that is supplied from the gas supply part 241a onto the one surface 511a of the laminate 511, and an air supply hose 241c that connects the injection nozzle 241b and the gas supply part 241a, as illustrated in FIG. 2B.

The gas supply part 241a is composed of a pump, a blower, and the like, and feeds gas to the injection nozzle 241b via the air supply hose 241c in a state in which a positive pressure is generated by pressurizing gas at a predetermined pressure.

The injection nozzle 241b injects the gas that is supplied via the air supply hose 241c toward the one surface 511a of the laminate 511 and generates the airflow V.

A valve 243 is provided on the air supply hose 241c, and it is possible to adjust the supplied amount of the gas that is injected from the injection nozzle 241b according to the opening degree of the valve 243. It is possible to adjust the intensity of the airflow V that is generated (pressure of the gas) by adjusting the supply amount of the gas. The intensity of the airflow V is proportional to the force that is received by the powdered adhesive 521 when the powdered adhesive 521 is washed away. Thus, it is possible to adjust the amount of the powdered adhesive 521 to be removed from the laminate 511 by adjusting the intensity of the airflow V. It is possible to form the applied density distribution of the powdered adhesive 521 with a plurality of stages by adjusting the amount of the powdered adhesive 521 that is removed from the laminate 511. Thus, after impregnating the laminate 511 with the adhesive 522, which is activated by melting the powdered adhesive 521, it is possible to form the content density distribution of the adhesive 522 with a plurality of stages, as illustrated in FIG. 6A.

The air intake unit 242 includes a negative pressure generating part 242a for generating a negative pressure, a suction nozzle 242b for suctioning the adhesive 520 and the gas that is discharged from the laminate 511 by means of the negative pressure that is generated by the negative pressure generating part 242a, and a suction hose 242c that connects the suction nozzle 242b and the negative pressure generating part 242a.

The negative pressure generating part 242a is connected to the suction nozzle 242b via the suction hose 242c. The negative pressure generating part 242a includes, for example, a recovery tank (not shown) that collects the suctioned powdered adhesive 521, and a ventilator (not shown) that generates the negative pressure inside the recovery tank by discharging the gas to the outside of the negative pressure generating part 242a. The negative pressure is generated by the ventilator, and the airflow V for discharging the powdered adhesive 521 and the gas from the suction nozzle 242b toward the recovery tank is generated by the negative pressure. The recovery tank includes a filter for capturing the powdered adhesive 521, and the gas is discharged to the outside from the ventilator in a state in which the powdered adhesive 521 is held in the recovery tank.

The restraining fixture 250 secures and restrains the first portion 541 of the laminate 511 from the lamination direction, as illustrated at the top of FIG. 1 and FIG. 2B. For example, the restraining fixture 250 can be composed of two pairs of clamping members 251 that are provided so as to be movable toward and away from each other.

The removal unit 240 and the restraining fixture 250 are fixed to a single movable part 252 and are configured to be integrally movable toward and away from the laminate 511. The removal unit 240 and the restraining fixture 250 are not limited to the configuration described above and may be configured so as to be independently movable by each being provided with an independently movable part.

The cutting unit 260 cuts the laminate 511 along a predetermined cutting line L, as illustrated at the top of FIG. 1 and in FIG. 4A. The cutting unit 260 may use various cutting mechanisms, such as ultrasonic cutting, laser cutting, circular saw cutting, press cutting, and scissor cutting. In the present embodiment, ultrasonic cutting is used, with which it is possible to execute accurate cuts in a relatively short period of time.

The heating unit 270 includes fixture heating units 271 for heating the restraining fixture 250 and a reheating unit 272 for reheating the laminate 511 that has been cut by the cutting unit 260, as illustrated at the top and middle of FIG. 1. The heating unit 270 heats and activates the powdered adhesive 521 that was applied by the application units 220.

Figure 3B:
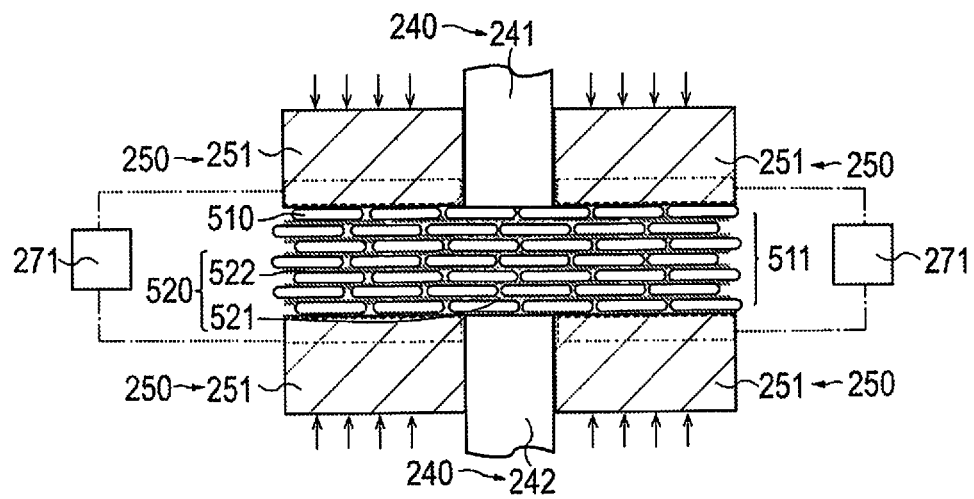
Figure 3C:
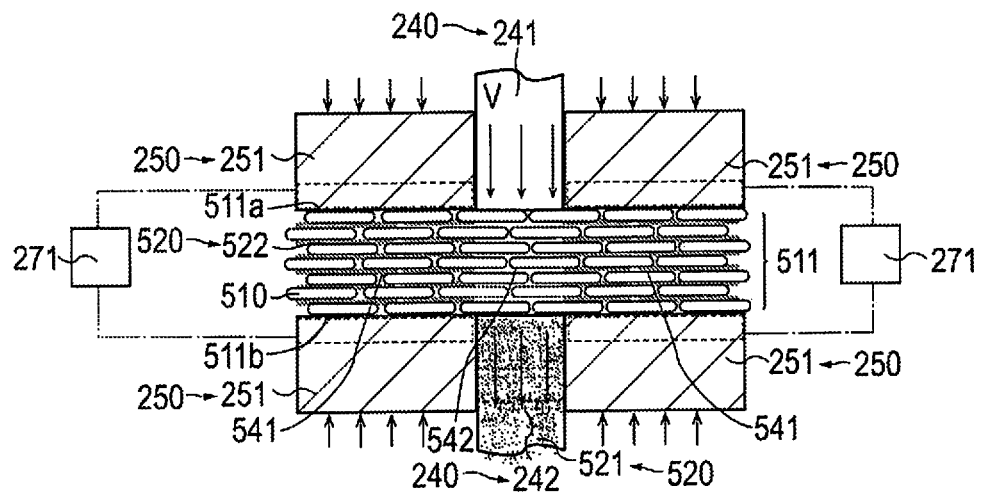

The fixture heating units 271 heat regions including the surfaces of the clamping members 251, included in the restraining fixture 250, that face the laminate 511 (the portions surrounded by the broken lines in FIG. 3B) to a predetermined temperature, as illustrated in FIGS. 2B and 3B. The fixture heating units 271 include, for example, a heat source composed of a thermoelectric element and a power source.

The reheating unit 272 heats the entire laminate 511, as illustrated in FIG. 5A. The heating temperature depends on the melting temperature of the adhesive 520 to be used, and is, for example, 70° C. to 150° C. Thus, it is possible to impregnate the laminate 511 with the adhesive 522, which is activated when the powdered adhesive 521 is softened or melted. As a result of impregnating the adhesive 522, the content amount of the adhesive 522 per unit area of the laminate 511, i.e., the content density, is determined. Although not particularly limited, the heating unit 270 is preferably composed of elements that can instantaneously and uniformly heat the laminate 511, examples of which include heating furnaces such as a continuous furnace, a high-frequency coil, a far infrared heater, and a hot air heater.

The preforming mold 280 preforms the laminate 511 into a predetermined three-dimensional shape. As shown in the middle of FIG. 1, the mold includes a lower die 281 on which is placed the laminate 511 to be molded into the preform 500, and an upper die 282 that can freely move toward and away from the lower die 281. A molding surface corresponding to the shape of the preform 500 is formed on the surface of the upper die 282 that faces the lower die 281. It is possible to mold the laminate 511 into the preform 500 by bringing the upper die 282 close to the lower die 281 and applying a pressurizing force to the laminate 511, in a state in which the laminate 511 is placed on the lower die 281.

As in the present embodiment, in the case of the preform 500 in which is formed a closed cross section by insertion of the core material 530, corners with large curvatures are often formed, such as those shown in FIG. 6B. When preforming the laminate 511, the amounts of deformation differ greatly between the inner sides and the outer sides of said corners. Therefore, misalignment between the layers of the laminate 511 becomes greater compared with flat portions with smaller curvatures. When the interlayer of the laminate 511 is bonded with the activated adhesive 522, the carbon fibers 510 are restrained together; therefore, deformation of the laminate 511 is restricted by the adhesive force of the adhesive 522. When preforming is carried out in a state in which the deformation of the laminate 511 is restricted, wrinkles, kinks, and the like occur in the portions of the molded preform 500 that have large curvatures.

In the present embodiment, the portions of the preformed three-dimensional shape with large curvatures and in which the amount of deformation at the time of molding is large are configured as the second regions 502, which are portions in which the content density of the adhesive 522 is relatively low. As a result, because the adhesive force of the adhesive 522 is relatively weak between the layers of the laminate 511, deformation of the second regions 502 can be easily realized. Therefore, it is possible to suppress the generation of wrinkles, kinks, and the like of those portions of the preform 500 with large curvatures. Thus, the degree of design freedom of the shape of the preform 500 is increased, and it is possible to expand the range of selectable shapes for the composite material 400.

Next, the composite material forming device 300 for forming the composite material 400 using the preform 500 will be described.

In an overview with reference to FIG. 7, the composite material forming device 300 according to the present embodiment comprises an molding die 310 that can be freely opened and closed, which forms a cavity 350 in which the preform 500 is placed, pressing unit 320 that load a clamping pressure on the molding die 310, a resin injection unit 330 for injecting molten resin 600 into the cavity 350, and a mold temperature adjustment unit 340 for adjusting the temperature of the molding die 310.

The molding die 310 has a pair of dies, an upper die 311 (male mold) and a lower die 312 (female mold), which can be opened and closed. The cavity 350, which can be hermetically sealed, is formed between the upper die 311 and the lower die 312. The preform 500 is placed inside the cavity 350.

The molding die 310 further comprises an injection port 313 for injecting the resin 600 into the cavity 350. The injection port 313 communicates with the cavity 350 and the resin injection unit 330. The inside of the preform 500 is impregnated with the resin 600 that is injected from the resin injection unit 330 from the surface. The configuration of the molding die 310 is not limited to the configuration described above; for example, a suction port for vacuuming the inside of the cavity 350 to suction the air therein may be provided on the lower die 312. Alternatively, a sealing member, or the like, may be provided on a mating surface between the upper die 311 and the lower die 312 in order to bring the interior of the cavity 350 into a sealed state.

The pressing unit 320 may be composed of, for example, a pressing machine comprising cylinders 321 that use fluid pressure such as hydraulic pressure, and that can freely adjust the clamping pressure by controlling the hydraulic pressure, and the like.

The resin injection unit 330 may be composed of a well-known circulation pump mechanism that is able to circulate, while supplying to the molding die 310, a main agent that is supplied from a main agent tank 331 and a curing agent that is supplied from a curing agent tank 332. The resin injection unit 330 communicates with the injection port 313 and injects the resin 600 into the cavity 350.

The mold temperature adjustment unit 340 heats the molding die 310 to a curing temperature of the resin 600 to cure the resin 600 that is injected inside the cavity 350. The mold temperature adjustment unit 340 may have, as a heating mechanism, for example, an electric heater that directly heats the molding die 310, a temperature adjustment mechanism that adjusts the temperature by circulating a heating medium such as oil, or the like.

The control unit 110 controls the operation of the entire manufacturing device 100. Specifically, with reference to FIG. 7, the control unit 110 comprises a storage unit 111, a calculation unit 112, and an input/output unit 113 that sends and receives various data and control commands. The input/output unit 113 is electrically connected to each unit of the device, such as the removal unit 240 and the restraining fixture 250.

The storage unit 111 is composed of a ROM and a RAM and stores data, such as the content density distribution of the adhesive 522 and the applied density distribution of the powdered adhesive 521 with respect to the carbon fibers 510. The calculation unit 112 is primarily composed of a CPU and receives data, such as the feeding speed of the carbon fibers 510 by the conveyance unit 210 via the input/output unit 113. The calculation unit 112 calculates the timing to remove the powdered adhesive 521, the intensity of the airflow V that is generated, the heating temperature of the restraining fixture 250 by the fixture heating units 271, etc., based on data read from the storage unit 111, as well as data received from the input/output unit 113. Control signals based on the calculated data are transmitted to each unit of the device, such as the removal unit 240 and the restraining fixture 250 via the input/output unit 113. In this manner, the control unit 110 controls the removal amount and removal positions of the powdered adhesive 521, the heating temperature of the restraining fixture 250, and the like.

Next, the manufacturing method for the composite material 400 according to the embodiment will be described.

In general, the manufacturing method for the composite material 400 includes two steps, a step for molding the preform 500, as illustrated in FIG. 9, and a step for forming the composite material 400 using the preform 500, as illustrated in FIG. 10.

First, the step for molding the preform 500 will be described.

The step for molding the preform 500 includes a supplying step (Step S101) for supplying the carbon fiber 510 material, an application step (Step S102) for applying the powdered adhesive 521 to the carbon fiber sheets 510, a lamination step (Step S103) for forming the laminate 511, a disposing step (Step S104) for disposing the removal unit 240 and the restraining fixture 250 on the laminate 511, a heating step (Step S105) for heating a portion of the laminate 511, a removal step (Step S106) for removing the powdered adhesive 521 from a portion of the laminate 511, a cutting step (Step S107) for cutting the laminate 511 into a predetermined shape, a reheating step (Step S108) for heating the laminate 511, a conveying step (Step S109) for conveying the laminate 511, a preforming step (Step S110) for preforming the laminate 511 to form the preform 500, and a demolding step (Step S111) for demolding the preform 500 from the preforming mold 280, as illustrated in FIG. 9.

Each of the steps will be described.

First, as illustrated at the top of FIG. 1 and in FIG. 2A, the carbon fiber sheets 510 are pulled out from the plurality of substrate rolls 510a, which are made by winding the carbon fibers 510, and the carbon fibers 510 are continuously supplied (Step S101). The supplied carbon fibers 510 are fed to the downstream side by means of the conveyance rollers 211.

Next, the unactivated powdered adhesive 521 is applied to at least one of the surfaces of the carbon fibers 510 that are continuously fed by the conveyance unit 210 by the application unit 220 (step S102). At this time, adjustments are made such that the powdered adhesive 521 is applied to the entire surface of the one surface of the carbon fibers 510 essentially uniformly.

Next, the carbon fibers 510 that are continuously fed by the laminating rollers 231 are laminated to form the laminate 511 (Step S103). In the present embodiment, the carbon fibers 510 with different lamination orientations are laminated to obtain a predetermined laminated structure. Specifically, three types of substrate rolls 510a, respectively composed of an NCF material in which the fiber orientation is ±45°, a UD material in which the fiber orientation is 90°, and the UD material in which the fiber orientation is 0°, are used, which are laminated according to a predetermined orientation order, to form the laminate 511.

Next, a portion of the laminate 511 is clamped in the restraining fixture 250 from the lamination direction, as illustrated in FIGS. 2B and 3A. At this time, the continuous flow of the laminate 511 from the upstream side to the downstream side is temporarily stopped. In the present embodiment, the removal unit 240 is configured to be integrally movable toward and away from the laminate 511 with the restraining fixture 250, and is thus disposed so as to face both surfaces of the laminate 511 together with the restraining fixture 250 (step S104).

Next, a portion of the laminate 511, in a state in which the powdered adhesive 521 is uniformly applied, is heated to melt or soften the powdered adhesive 521, thereby forming the activated adhesive 522, as illustrated in FIG. 3B (Step S105). Specifically, regions that include the surfaces of the clamping members 251, which are included in the restraining fixture 250, and that face the laminate 511 (the portions surrounded by the broken lines in FIG. 3B) are heated. Heat is conducted from the contact surface between the clamping member 251 and the laminate 511 to heat a portion of the powdered adhesive 521 that is disposed between the layers of the laminate 511. The heating temperature is not particularly limited, as long as it is a temperature at which the adhesive 520 softens or melts and becomes activated, and may be, for example, the melting temperature. In addition, the clamping member 251 may be heated to a predetermined temperature in advance. It is thereby possible to shorten the molding time.

Next, in a state in which the laminate 511 is being clamped by the clamping member 251, the removal unit 240 is driven and caused to generate the airflow V that flows from the one surface 511a to the other surface 511b in a portion of the laminate 511, as illustrated in FIG. 3C. The powdered adhesive 521 that is applied between the layers of the laminate 511 is discharged to the outside of the laminate 511 via gaps between the fibers of the carbon fibers 510 by means of the airflow V, to thereby remove a portion of the adhesive 520 (Step S106). As a result, the first portion 541 in which the powdered adhesive 521 is applied between the layers of the laminate 511 is formed in the portion that is being restrained by the restraining fixture 250, and the second portion 542, in which the applied density of the powdered adhesive 521 is less than that of the first portion 541, is formed in the portion where the airflow V is generated. In this manner, the applied density distribution of the powdered adhesive 521, which is formed by the first portion 541 and the second portion 542, forms the first region 501 and the second region 502, which are the content density distribution of the activated adhesive 522, after heating in the above-described heating step (Step S105) and the reheating step (Step S108), described further below.

Since a portion of the powdered adhesive 521 is removed immediately after the laminate 511 is formed, compared to a case in which the distribution of the adhesive 520 is formed for each sheet of the carbon fibers 510 in the application step, it is possible to form the first portion 541 and the second portion 542, which are the distribution of the powdered adhesive 521, in a shorter period of time.

In addition, when the powdered adhesive 521 is removed, by clamping and restraining the portion to be the first region 501 of the laminate 511 (first portion 541), it is possible to suppress the generation of the airflow V for removing the powdered adhesive 521 in the first region 501. Since it is thereby possible to suppress the removal of the powdered adhesive 521 from the first portion 541 by the airflow V, it is possible to more reliably form the first region 501 and the second region 502, which are made up of the distribution of the content density of the adhesive 520.

In the present embodiment, in the first region 501, there is a content density distribution that has a portion in which the content density of the adhesive 520 is high (dark colored portion in FIG. 6A) and a portion in which the content density is low (light colored portion in FIG. 6A), as illustrated in FIG. 6A. Similarly, a content density distribution also exists in the second region 502. In this manner, when the content density distribution is formed having three or more stages, it is preferable to set the area around the cutting line L, which is cut by the cutting unit 260, described further below, at the portion with the highest content density of the adhesive 520. In addition, the distribution of the content density is formed such that the portions with large curvatures in the three-dimensional shape molded by means of the preforming mold 280 (portions surrounded by the broken lines) are set as second region 502, which are portions in which the content density of the adhesive 520 is relatively low, as illustrated in FIG. 6B.

As in the present embodiment, by carrying out the removal step (Step S106) after the heating step (Step S105), the airflow V is generated in the portions of the laminate 511 that are not heated in a state in which a portion of the powdered adhesive 521 is heated and melted or softened into a gel state, in order to remove the powdered adhesive 521. As a result, it is possible to further suppress the removal of the powdered adhesive 521 from those portions that will become the first regions 501 by the airflow V, and it is possible to more reliably form the distribution of the content density in the first regions 501 and the second regions 502.

When the removal step (Step S106) is ended, the continuous flow of the laminate 511 from the upstream side to the downstream side by means of the conveyance unit 210 is restarted. Thereafter, the carbon fibers 510 are cut along the cutting line L in a state in which the adhesive 520 is melted, as illustrated in FIG. 4A (Step S107). The expanded shape of the composite material 400, which is the molded article, is set in advance, and the cutting line L is determined according to the expanded shape.

Figure 4B:
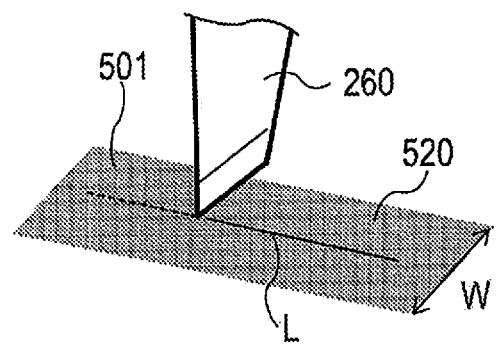

The periphery of the cutting line L is disposed in the first regions 501, where the content density of the adhesive 520 is higher than in the second regions 502. The first regions 501 are formed such that the adhesive 520 is applied in a strip shape provided with a predetermined application width W with respect to the cutting line L, as illustrated in FIG. 4B. The application width W of the adhesive 520 depends on a predetermined tolerance of the cutting line L, but may be, for example, 1-20 mm. By activating the adhesive 520, the periphery of the cutting line L is fixed by the adhesive 520, and it is possible to suppress fraying of the cut surface at the time of cutting or at the time of conveyance to the next step after cutting. In addition, even when the portion to be cut is misaligned with respect to the cutting line L, since the content density of the adhesive 520 is high in the periphery of the cutting line L, it is possible to suppress fraying of the cut surface. If fraying of the cut surface occurs, it becomes necessary to remove the portion where the fraying occurred after the composite material 400 is molded. By suppressing the fraying of the cut surface, it is possible to reduce post-processing for removal of the portion where the fraying occurred; therefore, the molding time can be shortened and, because it is not necessary to remove the portion where the fraying occurred, it is possible to improve the yield.

Next, the entire laminate 511 is reheated, as illustrated in FIG. 5A (Step S108). As a result, for example, it is possible to heat the powdered adhesive 521 that remains in the second portions 542 of the laminate 511 and that has not been heated in order to activate the powdered adhesive in the heating step (Step S105). In addition, because it is possible to carry out preforming in a state in which the adhesive 520 is softened by heating the adhesive 520 before the preforming step (Step S110), preforming becomes relatively easy. As in the case in which the powdered adhesive 521 is not applied to the second portions 542 of the laminate 511, in the case in which it is possible to activate the powdered adhesive 521 that is applied to the laminate 511 by means of the heating step (Step S105), the reheating step (Step S108) can be omitted.

Figure 5B:
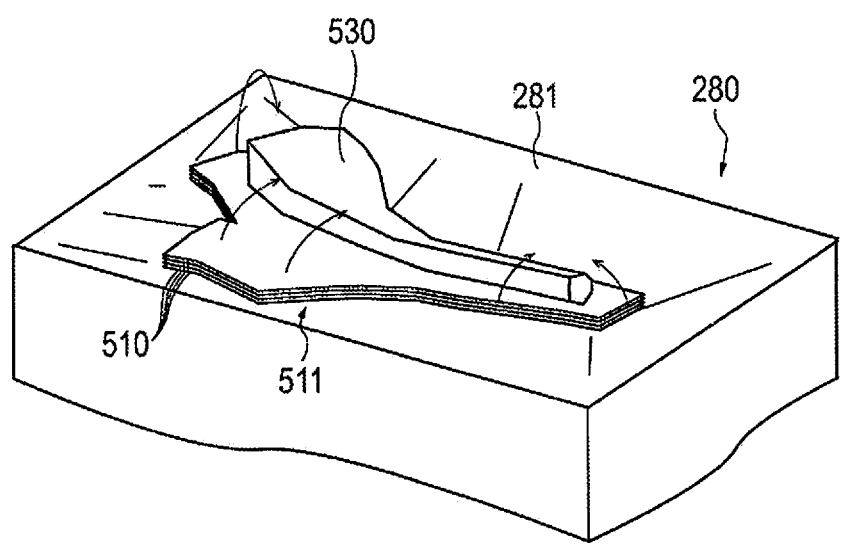

Next, the laminate 511 is conveyed to and placed in the lower die 281 of the preforming mold 280, as illustrated in FIG. 5B (Step S109). At this time, because the interlayer of the carbon fibers 510 is bonded by means of the activated adhesive 522, it is possible to suppress dispersion in the carbon fibers 510 at the time of conveyance.

Next, the laminate 511 of the carbon fibers 510 that are placed on the lower die 281 of the preforming mold 280 is preformed to mold the preform 500, as illustrated in FIG. 5B (Step S110). At this time, the core material 530 is disposed so as to be coated by the carbon fibers 510. The upper die 282 may be formed from a plurality of divided molds, as illustrated in the preforming step in the middle of FIG. 1, or an upper die composed of one undivided mold may be used. The preforming mold 280 is preferably cooled to 20-40° C., for example. Cooling of the adhesive 522 is thereby carried out at the same time that the mold is closed, and the adhesive 522 is cured to complete the preforming.

Next, the preforming mold 280 is opened and the preform 500 is demolded, thereby completing the molding of the preform 500 (Step S111). Within the shape of the molded preform 500, the flat surface portions where the curvature is small are the first regions 501 in which the content density of the adhesive 522 is relatively high, and the portions with large curvatures (portions surrounded by the broken lines) are the second regions 502 in which the content density of the adhesive 522 is relatively low, as illustrated in FIG. 6B.

Next, the step for forming the composite material 400 using the preform 500 will be described.

The step for forming the composite material 400 includes a step for disposing the preform 500 in the cavity 350 of the molding die 310 (Step S201), a step for injecting the resin 600 into the cavity 350 (step S202), a step for curing the resin 600 (Step S203), and a step for demolding the molded composite material 400 from the molding die 310 (Step S204), as illustrated in FIG. 10.

Each of the steps will be described.

First, the preform 500 is placed in the cavity 350 of the molding die 310, as illustrated in FIG. 7 (Step S201).

Next, the resin 600 is injected into the cavity 350 (Step S202). The molding die 310 is preheated to at least a curing temperature (for example, about 100° C. to 160° C.) of the resin 600 (for example, an epoxy resin).

Next, the resin 600 that is impregnated in the carbon fibers 510 is cured (Step S203).

Next, after the resin 600 is cured, the molding die 310 is opened and the composite material 400 in which the carbon fibers 510, the resin 600, and the core material 530 are integrated is demolded, thereby completing the molding (Step S204).

As described above, according to the manufacturing method and the manufacturing device 100 for the composite material 400 of the present embodiment, a portion of the powdered adhesive 521 that is applied between the layers of the laminate 511 is removed by means of the airflow V that is generated in the lamination direction of the carbon fibers 510 to form the first portions 541 and the second portions 542, in which the applied density of the powdered adhesive 521 is less than that of the first portions 541. Furthermore, the powdered adhesive 521 is activated to form the preform 500 having the first regions 501 in which the laminate 511 is impregnated with the activated adhesive 522, and the second regions 502 in which the content density of the adhesive 522 is less than that of the first regions 501.

In accordance with the manufacturing method and the manufacturing device 100 for the composite material 400 configured in this manner, it is possible to suppress the generation of wrinkles, kinks, and the like in those portions that do not readily deform when the laminate 511 is pressed to mold the preform 500 by accurately controlling the content density distribution of the adhesive 522 by means of the airflow V that is generated in the lamination direction of the carbon fibers 510. It is possible to form the composite material 400 with higher quality by forming the composite material 400 from the preform 500. Even if the airflow were generated in the in-plane direction instead of the lamination direction of the laminated carbon fibers 510, although a portion of the powdered adhesive 521 can be removed, the position thereof cannot be controlled; therefore, it is difficult to suppress the generation of wrinkles, kinks, and the like, in those portions that do not readily deform.

In addition, during forming, the preform 500 is formed to be a three-dimensional shape in which the curvatures of the second regions 502 are greater than those in the first regions 501. Because the content density of the adhesive 522 is lower in the second regions 502 than in the first regions 501, the carbon fibers 510 can be easily deformed in the second regions 502. Because it is possible to suppress the generation of wrinkles, kinks, etc., of the preform 500 in those portions with large curvatures, it is possible to increase the degree of design freedom of the shape of the preform 500. It is thereby possible to expand the range of selectable shapes for the composite material 400 while suppressing variations in the arrangement of the carbon fibers 510 with the adhesive 522.

In addition, during removal of the powdered adhesive 521, those portions that will become the first portions 541 of the laminate 511 are clamped from the lamination direction. By clamping and restraining those portions that will become the first portions 541 from which the powdered adhesive 521 is not removed, it is possible to suppress the generation of the airflow V for removal of the powdered adhesive 521. As a result, it is possible to suppress the removal of the powdered adhesive 521 from those portions that will become the first portions 541 by the airflow V, and it is possible to form the distribution of the content density of the adhesive 520 in the first regions 501 and the second regions 502 after activation of the adhesive.

In addition, the powdered adhesive 521 that is applied to those portions that will become the first portions 541 of the laminate 511 are heated before removal of the powdered adhesive 521. The airflow V is generated in to those portions that will become the second portions 542 to remove the powdered adhesive 521, in a state in which the powdered adhesive 521 applied to those portions that will become the first portions 541 is heated and melted or softened into a gel state. As a result, it is possible to further suppress the removal of the powdered adhesive 521 from those portions that will become the first portions 541 by the airflow V, and it is possible to more reliably form the distribution of the content density in the first regions 501 and the second regions 502 after activation of the adhesive.

In addition, a cutting step for cutting the carbon fibers 510 along the cutting line L is carried out after the heating step for activating the powdered adhesive 521 and before the preforming step for forming the preform 500. Furthermore, the first regions 501 include the cutting line L. By activating the powdered adhesive 521, the periphery of the cutting line L is fixed by the activated adhesive 522, and it is possible to suppress fraying of the cut surface at the time of cutting or at the time of conveyance to the next step after cutting. By suppressing the fraying of the cut surface, it is possible to reduce post-processing for removal of the portion in which the fraying occurred; therefore, the molding time can be shortened and, because it is not necessary to remove the portion where the fraying occurred, it is possible to improve the yield.

Figure 11A:
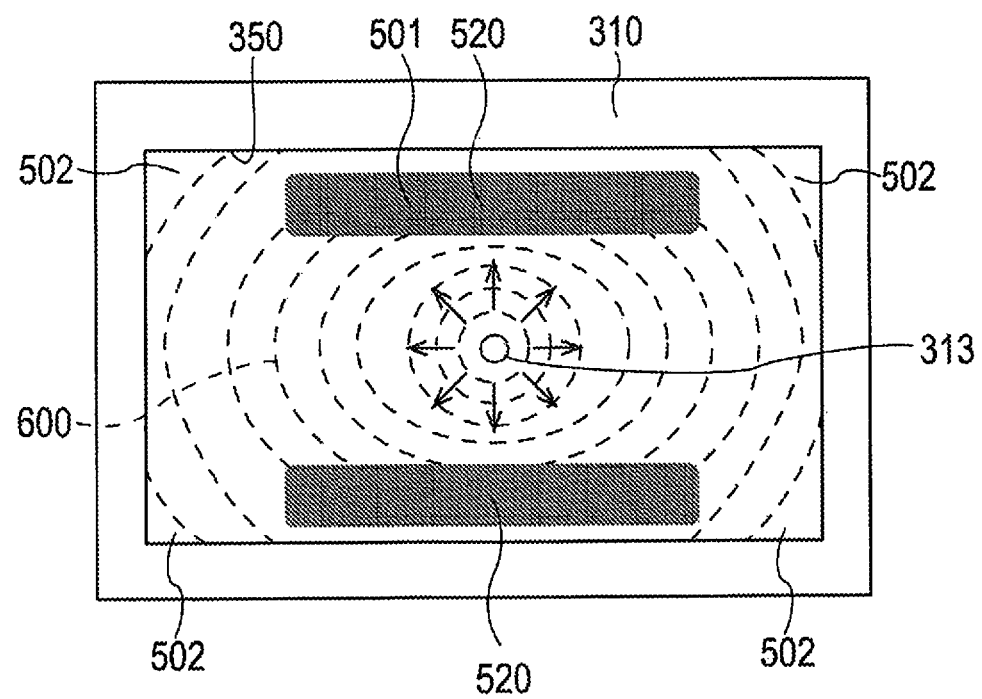

A modified example of the above-described first embodiment will be described with reference to FIGS. 11 and 12.

FIG. 11 is a conceptual view for explaining a principle of the modified example of the first embodiment. FIG. 12 is a view illustrating a temporal transition of a pressure $P_r$ inside the cavity 350 when the manufacturing method for the composite material 400 according to the modified example of the first embodiment is implemented. The arrows in FIG. 11 indicate the direction of the flow of the resin 600.

The manufacturing method for the composite material 400 according to the modified example is different from the first embodiment in the arrangement of the first regions 501 and the second regions 502, which are formed in the removal step (Step S106) of the step for forming the preform 500 illustrated in FIG. 9. The manufacturing device 100 has the same configuration as in the first embodiment, so that the same reference symbols have been assigned and the descriptions thereof have been omitted.

Figure 11B:
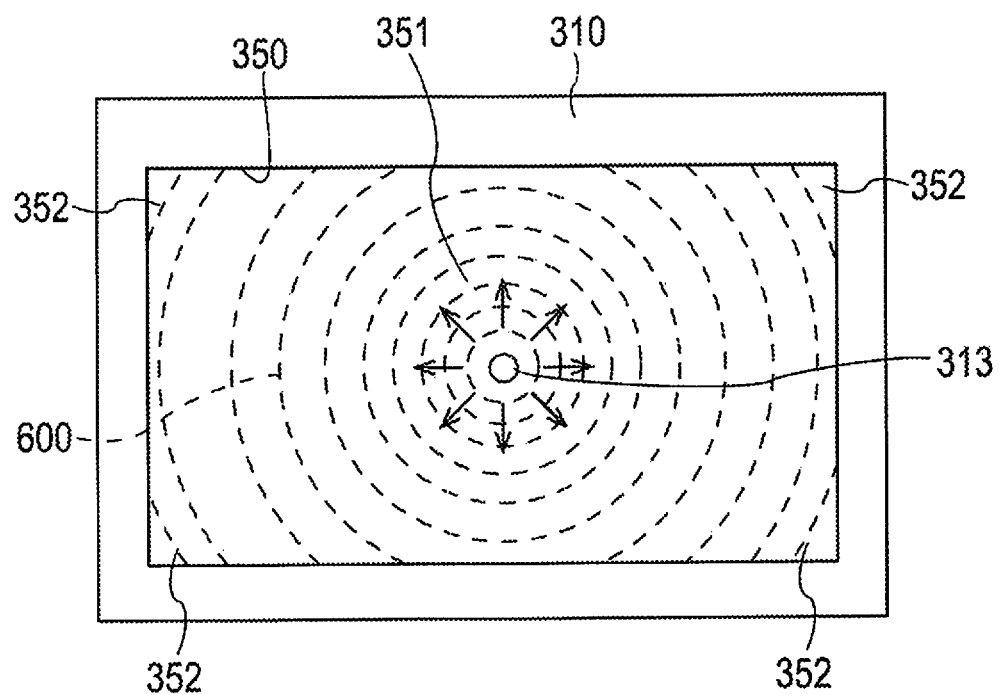
Figure 12:
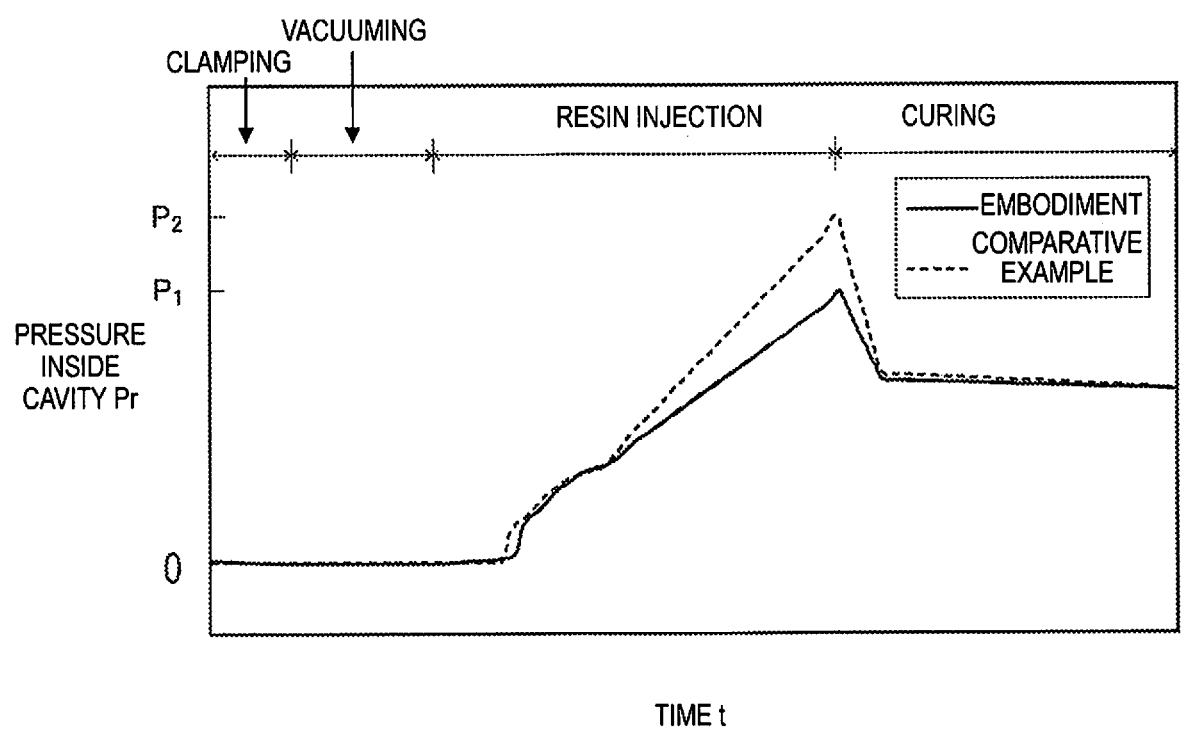
FIG. 12 is a view illustrating a temporal transition of a pressure inside a cavity when the manufacturing method for a composite material according to the modified example of the first embodiment is implemented.

When the cavity 350 of the molding die 310 on which the laminate 511 of the carbon fibers 510 is placed is seen from above, the resin 600 flows from the injection port 313 concentrically outward, as illustrated in FIG. 11B. Thus, the peripheral edge portions of the cavity 350 away from the injection port 313 become portions 352 to which the resin 600 hardly flows. In order to cause the resin 600 to reach the portions 352 to which the resin 600 hardly flows, the maximum injection pressure in the injection operation of the resin 600 is necessarily set to a high value, as illustrated by the broken line in FIG. 12. When the maximum injection pressure for filling with the resin 600 is set to a high value, the maximum pressure $P_2$ inside the cavity 350 also increases accordingly. Therefore, it is necessary to use a large pressing machine that can apply a greater clamping pressure in order to prevent the unintentional opening of the molding die 310 during application of the injection pressure.

In the present embodiment, the powdered adhesive 521 is removed such that the first regions 501 are disposed, for example, in portions 351 to which the resin 600 readily flows, such as the vicinity of the injection port 313, and that the second regions 502 are formed, for example, in the portions 352 to which the resin 600 hardly flows, such as the peripheral edge portions of the cavity 350, as illustrated in FIG. 11A (Step S106). In the second regions 502 in which the content density of the adhesive 522 is relatively low, the flow resistance of the resin 600 becomes low compared to the first regions 501. Thus, in the step for injecting the resin 600 into the cavity 350 (Step S202 in FIG. 10), it is possible to carry out control such that the resin 600 flows relatively easily to the portions 352 to which the resin 600 hardly flows, in which the second regions 502 are disposed. Because it thereby becomes possible to cause the resin 600 to reach the entire cavity in a short period of time without increasing the injection pressure of the resin 600, it is possible to reduce the maximum injection pressure of the resin 600, as illustrated by the solid line in FIG. 12. Because it is possible to suppress the maximum pressure $P_1$ inside the cavity 350 to a relatively low value, it is possible to reduce both the molding time and capital equipment expenditures.

In addition, in the present embodiment, the resin 600 is formed an epoxy resin and the adhesive 520 is formed from low molecular weight epoxy resin. Since the resin 600 and the adhesive 520 are formed from similar materials, during molding of the composite material 400, it is possible to form the composite material 400 to be uniform by integrating with the resin 600 by suppressing the formation of an interface between the resin 600 and the adhesive 520. Thus, during the initial stages of the injection of the resin 600, the adhesive 520 has the effect of guiding the resin 600 to the portions 352 to which the resin 600 hardly flows, and it is possible to control the flow of the resin 600. As the injection of the resin 600 progresses, the adhesive 520 softens due to the reaction heat that accompanies the curing of the resin 600, and the like, and the resin 600 gradually spreads across the entire inside of the cavity 350; therefore, it becomes possible to more evenly mix the resin 600 and the adhesive 520.

As described above, according to the manufacturing method and the manufacturing device 100 for the composite material 400 according to the modified example of the first embodiment, a portion of the powdered adhesive 521 that is applied between the layers of the laminate 511 is removed by means of the airflow V to form the first portions 541 and the second portions 542, in which the applied density of the powdered adhesive 521 is less than that of the first portions 541. Furthermore, the powdered adhesive 521 is activated to form the preform 500 having the first regions 501, in which the laminate 511 is impregnated with the activated adhesive 522, and the second regions 502, in which the content density of the adhesive 522 is less than that of the first regions 501. It is thereby possible to obtain the same effects as the first embodiment. Furthermore, by controlling the content density of the adhesive 522, it is possible to form the composite material 400 in a relatively short period of time by facilitating the impregnation of resin 600 irrespective of the portion of the preform 500.

In addition, the resin 600 that is injected into the cavity 350 flows more easily in the portions of the cavity 350 in which the second regions 502 of the laminate 511 are disposed, compared to the portions where the first regions 501 are disposed. Thus, compared to a case in which a preform with a uniform content density of the resin 520 is placed inside the cavity 350, it becomes possible to facilitate the flow of the resin 600 to the portions 352 to which the resin 600 hardly flows. Thus, it becomes possible to make the resin 600 reach the entirety of the carbon fibers 510 in the cavity 350 in a relatively short period of time by facilitating the impregnation of the resin 600 irrespective of the portion of the preform 500. It is thereby possible to reduce both the molding time and capital equipment expenditures since it is possible to keep the maximum pressure $P_1$ within the cavity 350 to a relatively small value.

Second Embodiment

The second embodiment will be described with reference to FIGS. 13-17.

Figure 13:
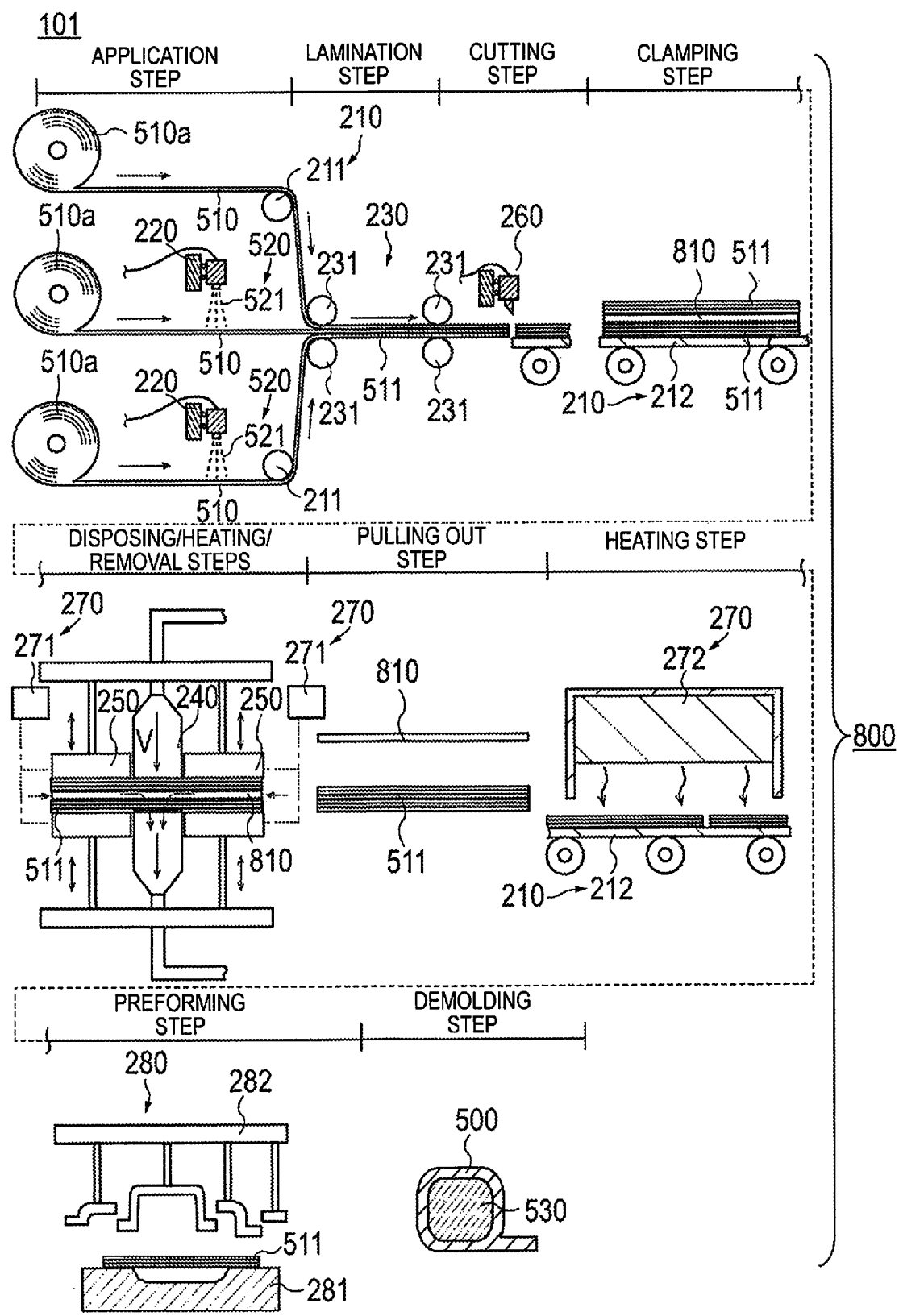
FIG. 13 is a view for explaining the overall flow of the manufacturing device and the manufacturing method for a composite material according to a second embodiment.
Figure 14A:
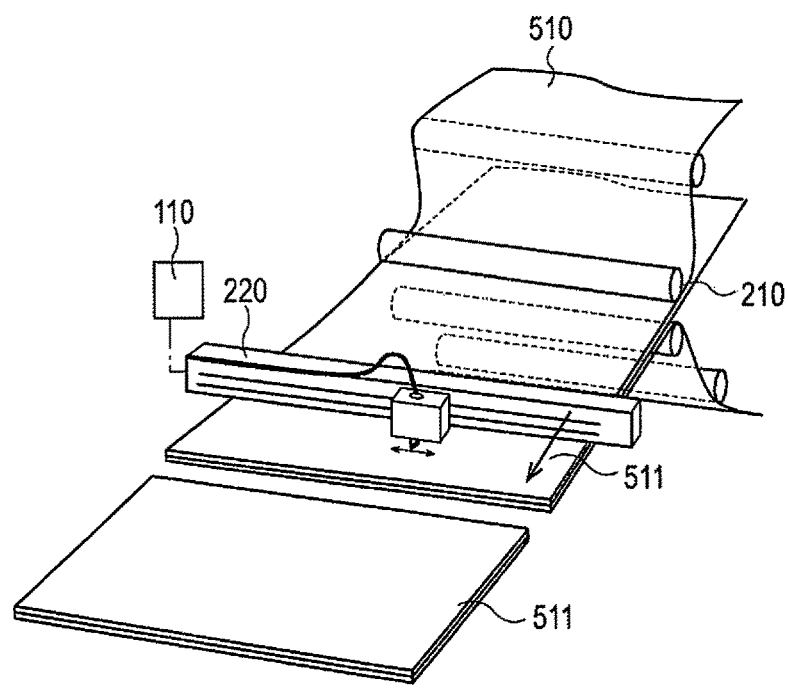
FIG. 14A is a schematic perspective view of a cutting unit of a preforming device for molding the preform according to the second embodiment.
Figure 14B:
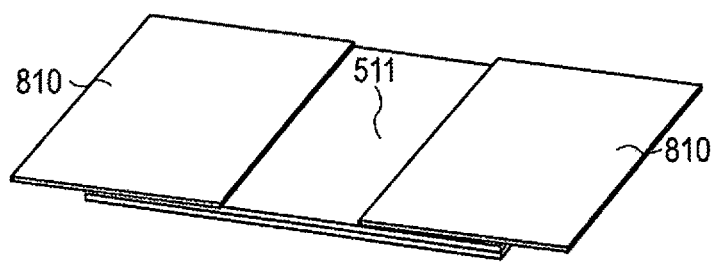
FIGS. 14B and 14C are views for explaining a procedure for clamping a plate-shaped member between the layers of the laminate.
Figure 14C:
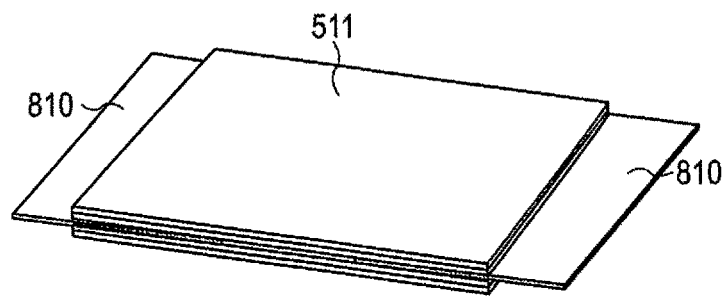

FIG. 13 is a view for explaining the overall flow of a manufacturing device 101 and the manufacturing method for the composite material 400 according to the second embodiment. FIG. 14A is a schematic perspective view of the cutting unit 260 of a preforming device 800 for molding the preform 500 according to the second embodiment, and FIGS. 14B and 14C are views for explaining a procedure for clamping a plate-shaped member 810 between the layers of the laminate 511. FIGS. 15 and 16 are views for explaining the operations of the removal unit 240 and the restraining fixture 250 according to the second embodiment. FIG. 17 is a flowchart illustrating the molding method for the preform 500 according to the second embodiment.

The number of laminated layers of the carbon fiber sheets 510 is determined according to the basis weight and the content of the carbon fibers 510 with respect to the designed plate thickness of the composite material 400 as the molded article. A typical member often has 4 or 5 laminated layers of carbon fibers 510, but a relatively large structural member may have 10 or more laminated layers. The airflow V that is generated by means of the removal unit 240 encounters resistance from the carbon fibers 510 as the airflow travels inside the laminate 511. Thus, the intensity of the airflow V (gas pressure) is gradually attenuated from the one surface 511a toward the other surface 511b. Because the plate thickness of the laminate 511 increases as the number of laminated layers increases, the ability of the airflow V to remove the powdered adhesive 521 is reduced. As a result, it becomes difficult to adjust the content density distribution of the adhesive 520, and there are cases in which the first regions 501 and the second regions 502 cannot be formed in accordance with the designed arrangement.

Thus, in the second embodiment, an auxiliary airflow V1 is generated in addition to the airflow V such that it becomes possible to remove the powdered adhesive 521 and form the first regions 501 and the second regions 502 according to the designed arrangement, even when the number of laminated layers increases. The manufacturing device 101 and the manufacturing method according to the second embodiment will be described below.

The manufacturing device 101 for the composite material 400 according to the second embodiment comprises the preforming device 800 for molding the preform 500, and a composite material forming device 300 for forming the composite material 400, in the same manner as the manufacturing device 100 for the composite material 400 according to the first embodiment. The composite material forming device 300 has the same configuration as in the first embodiment, so that the same reference symbols have been assigned and the descriptions thereof have been omitted.

The preforming device 800 is different from that of the first embodiment in that a plate-shaped member 810 is further provided disposed between the layers of the laminate 511. Because the other configurations are the same as those in the first embodiment, the same reference symbols have been assigned and the descriptions thereof have been omitted.

Figure 15A:
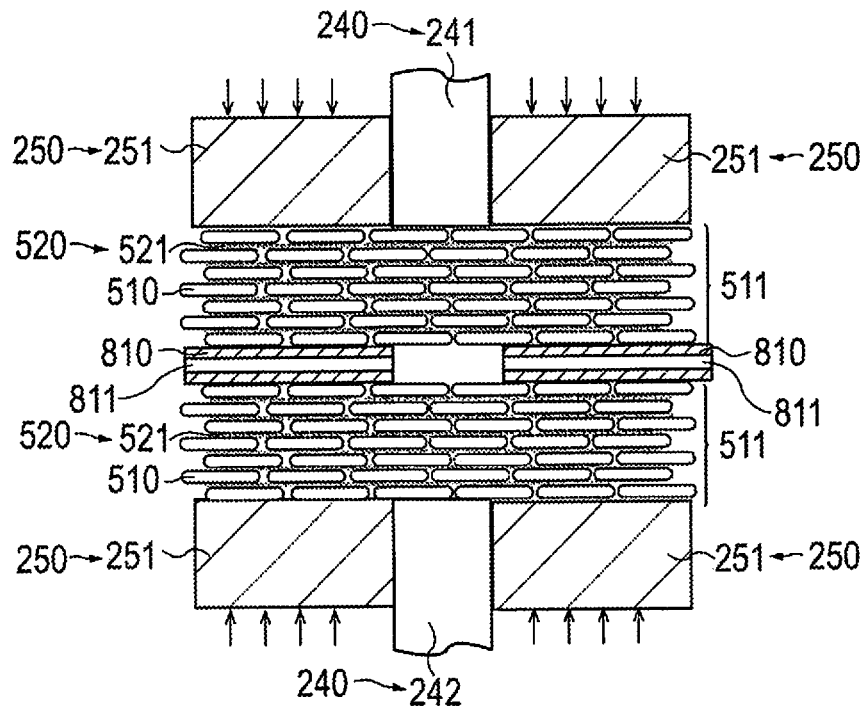
Figure 16A:
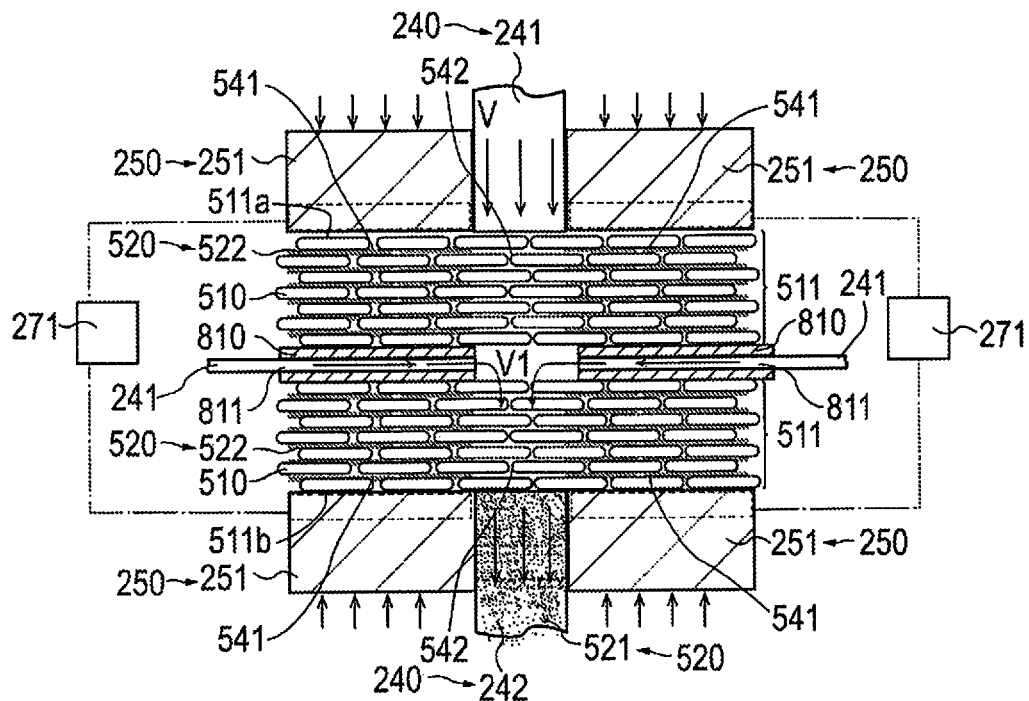

The plate-shaped member 810 has a hollow structure and comprises a flow passage 811 through which gas can flow, as illustrated in FIG. 15A.

The removal unit 240 generates the airflow V that flows from the one surface 511a to the other surface 511b of the laminate 511, as well as generating the auxiliary airflow V1 that flows in from the planar direction of the laminate 511 via the flow passage 811 and joins with the airflow V. By supplementation with the auxiliary airflow V1, the intensity of the airflow for removal of the powdered adhesive 521 is not attenuated and it is possible to reliably remove the powdered adhesive 521 even if the number of laminated layers of the laminate 511 increases.

The air blowing unit 241 provided in the removal unit 240 supplies the gas to the flow passage 811. Specifically, the flow passage 811 is connected to the air supply hose 241c. The gas supply part 241a pressurizes the gas to a predetermined pressure and feeds the gas into the flow passage 811 via the air supply hose 241c by means of the positive pressure that is thereby generated. It is thus possible to generate the auxiliary airflow V1 between the layers of the laminate 511.

Next, the manufacturing method for the composite material 400 according to the embodiment will be described.

Generally, the manufacturing method for the composite material 400 includes two steps, a step for molding the preform 500 and a step for forming the composite material 400 using the preform 500, in the same manner as in the first embodiment described above. The step for forming the composite material 400 is the same as in the first embodiment, so that a description thereof has been omitted. The step for molding the preform 500 will be described with reference to FIG. 17.

The step for molding the preform 500 includes a supplying step (Step S301) for supplying the carbon fiber 510 material, an application step (Step S302) for applying the powdered adhesive 521 to the carbon fiber sheets 510, a lamination step (Step S303) for forming the laminate 511, a cutting step (Step S304) for cutting the laminate 511 into a predetermined length, a clamping step (step S305) for sandwiching the plate-shaped member 810 between the layers of the laminate 511, a disposing step (Step S306) for disposing the removal unit 240 and the restraining fixture 250 on the laminate 511, a heating step (Step S307) for heating a portion of the laminate 511, a removal step (Step S308) for removing the powdered adhesive 521 from a portion of the laminate 511, a pulling out step (Step S309) for pulling the plate-shaped member 810 from between the layers of the laminate 511, a reheating step (Step S310) for heating the laminate 511, a conveying step (Step S311) for conveying the laminate 511, a preforming step (Step S312) for preforming the carbon fibers 510 to form the preform 500, and a demolding step (Step S313) for demolding the preform 500 from the preforming mold 280.

Each of the steps will be described. Since the supplying step (Step S301), the application step (Step S302), the lamination step (Step S303), the disposing step (Step S306), the heating step (Step S307), the reheating step (Step S310), the conveying step (Step S311), the preforming step (Step S312), and the demolding step (Step S313) are the same as those in the first embodiment, the descriptions thereof are omitted.

After the laminate 511 has been formed (Step S303), the laminate 511 is cut to a predetermined length, as illustrated in FIG. 14A (Step S304).

Next, two plate-shaped members 810 are disposed on the cut laminate 511, as illustrated in FIG. 14B. The plate-shaped members 810 are disposed with a gap therebetween, in the portion of the laminate 511 in which the airflow V is generated in the lamination direction. The cut laminate 511 is further superposed on the plate-shaped members 810. In this manner, the plate-shaped members 810 are sandwiched between the layers of the laminate 511, as illustrated in FIG. 14C (Step S305).

Next, the removal unit 240 and the restraining fixture 250 are disposed as illustrated in the middle of FIG. 13 and in FIG. 15A (Step S306).

Figure 15B:
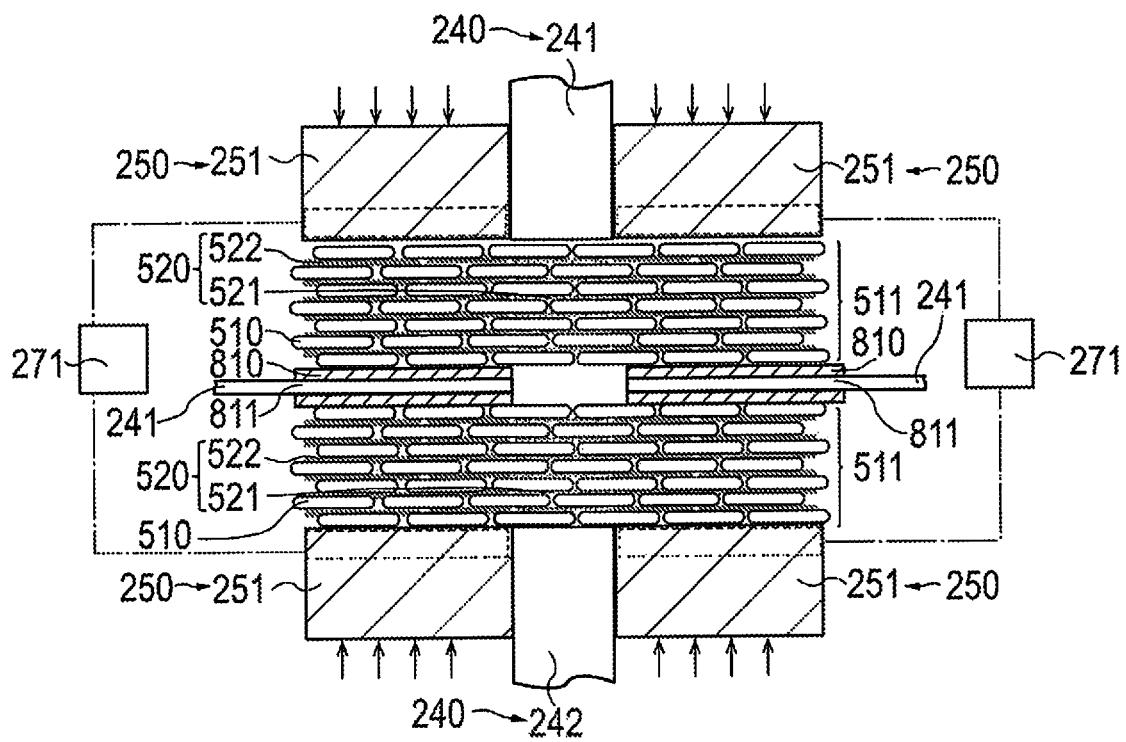
FIG. 15B illustrates a state in which a portion of the laminate is heated.

Next, a portion of the laminate 511, in a state in which the powdered adhesive 521 is uniformly applied, is heated to melt or soften the powdered adhesive 521, to thereby form the activated adhesive 522, as illustrated in FIG. 15B (Step S307). Specifically, regions including the surfaces of the clamping members 251, included in the restraining fixture 250, which face the laminate 511 (the portions surrounded by the broken lines in FIG. 15B) are heated, in the same manner as in the first embodiment. Heat is conducted from the contact surface between the clamping member 251 and the laminate 511 to heat a portion of the powdered adhesive 521 that is disposed between the layers of the laminate 511.

Next, the airflow V and the auxiliary airflow V1 are generated by the removal unit 240. In a state in which the laminate 511 is being clamped by the clamping member 251, the removal unit 240 is driven and caused to generate the airflow V that flows in the lamination direction in portions other than the portions of the laminate 511 that are being restrained by the restraining fixture 250 and the portions where the plate-shaped members 810 are not disposed. The powdered adhesive 521 that is applied between the layers of the laminate 511 is discharged to the outside of the laminate 511 via gaps between the fibers of the carbon fibers 510 by means of the airflow V, to thereby remove a portion of the powdered adhesive 521, as illustrated in FIG. 16A (Step S308). As a result, the first portion 541, in which the adhesive 520 is applied between the layers, is formed in the portion that is being restrained by the restraining fixture 250, and the second portion 542, in which the applied density of the powdered adhesive 521 is less than that of the first portion 541, is formed in the portion from which part of the powdered adhesive 521 has been removed.

Figure 16B:
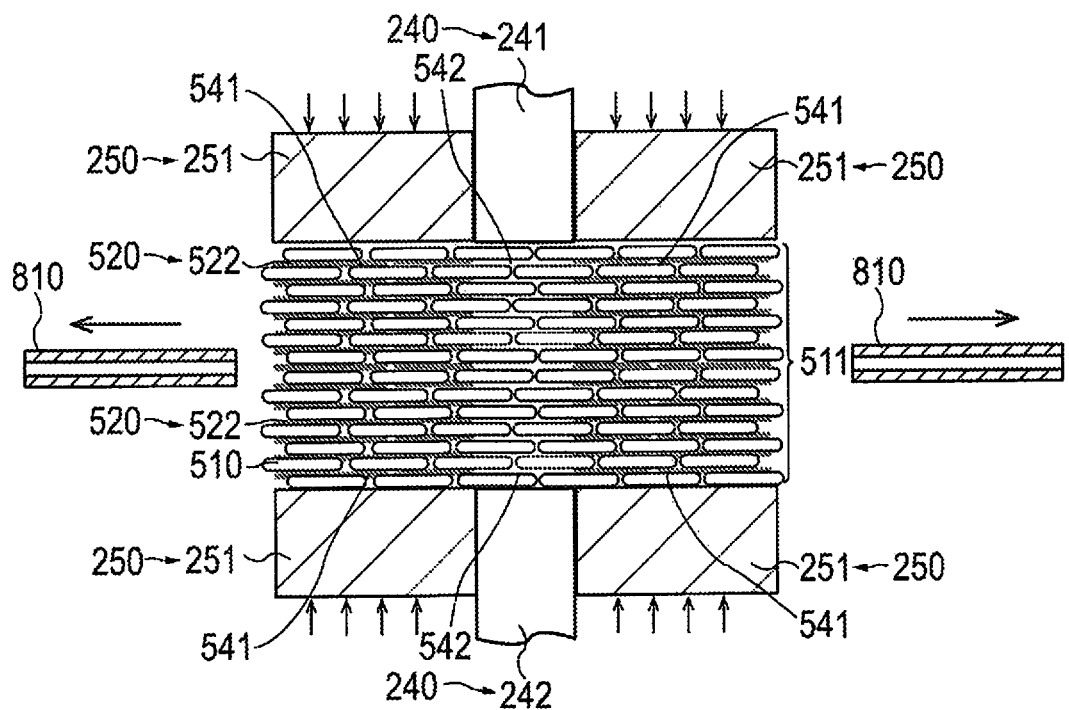
Figure 17:
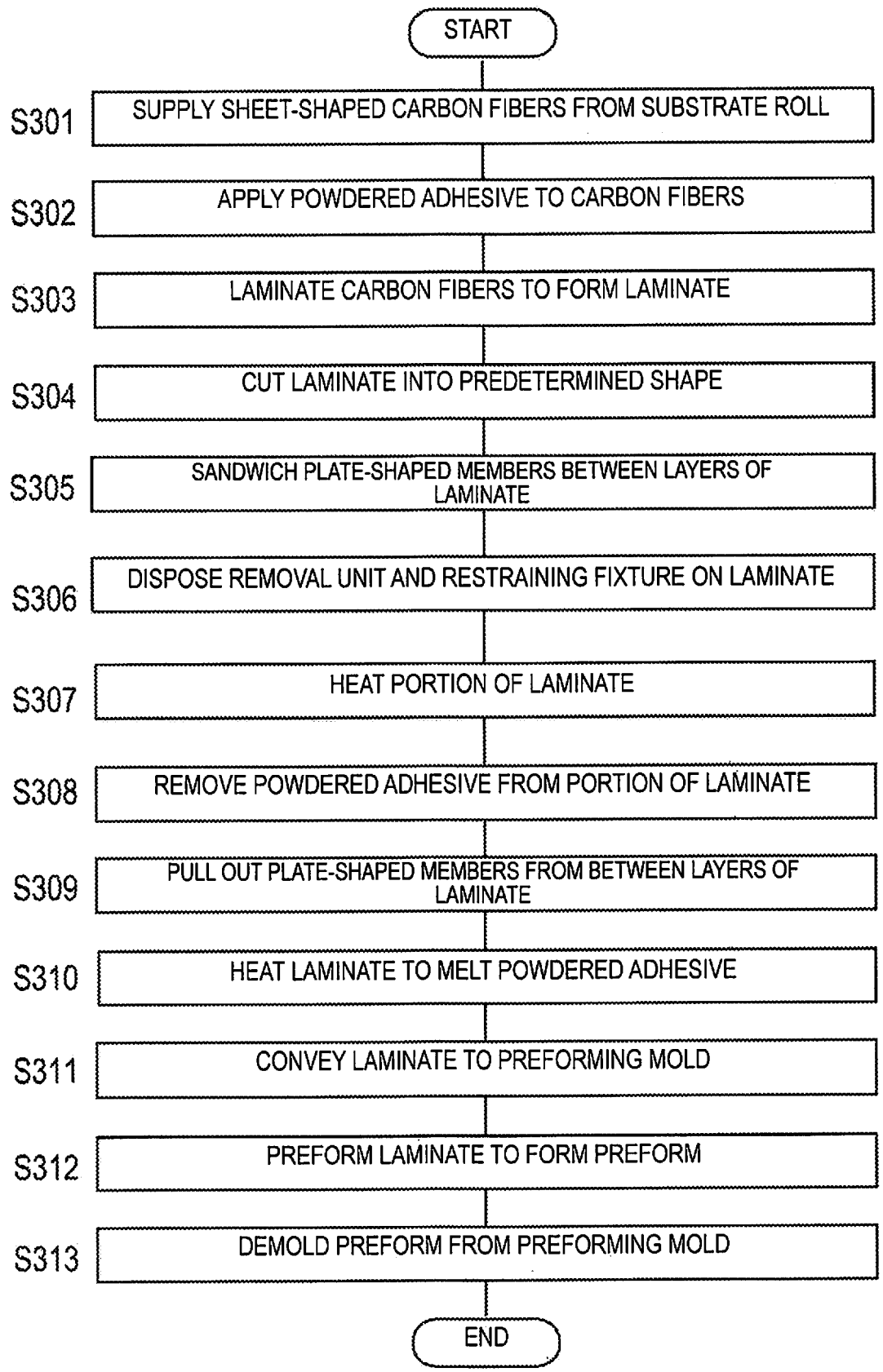
FIG. 17 is a flowchart illustrating the molding method for the preform according to the second embodiment.

Next, the plate-shaped members 810 are pulled out from between the layers of the laminate 511, as illustrated in FIG. 16B (Step S309). At this time, it is preferable to pull out the plate-shaped members in a direction that is perpendicular to the planar direction of the laminate 511 with respect to the flow direction of the laminate 511, so as to not inhibit the continuous flow of the laminate 511 from the upstream side to the downstream side.

Next, the powdered adhesive 521 is activated by means of the reheating step (Step S310) to form the preform 500 having the first regions 501, in which the laminate 511 is impregnated with the activated adhesive 522, and the second regions 502, in which the content density of the adhesive 522 is less than that of the first regions 501.

Thereafter, the preform 500 is completed through the conveying step (Step S311), the preforming step (Step S312), and the demolding step (Step S313), in the same manner as in the first embodiment described above.

As described above, in accordance with the manufacturing method and the manufacturing device 101 for the composite material 400 of the second embodiment, the plate-shaped members 810, having a flow passage 811 through which the gas can flow, are sandwiched between the laminate 511 before the powdered adhesive 521 is removed, and during removal of the powdered adhesive 521, the auxiliary airflow V1, which is joined with the airflow V via the flow passage 811 of the plate-shaped members 810, is supplied to those portions that will become the second portions 542 of the laminate 511. It is thereby possible to obtain the same effects as those in the first embodiment, and by supplementation with the auxiliary airflow V1, the intensity of the airflow for removing the powdered adhesive 521 is not attenuated, and it is possible to reliably remove the powdered adhesive 521 even if the number of laminated layers of the laminate 511 increases.

The manufacturing method and the manufacturing device for the composite material were described by means of embodiments and a modified example, but the present invention is not limited to the configurations described in the embodiments and may be appropriately modified based on the descriptions of the Claims.

For example, the removal unit has an air blowing unit and an air intake unit, but is not particularly limited as long as the configuration is capable of generating the airflow that flows from one surface to the other surface in the lamination direction of the carbon fibers with respect to the laminate, and may have either one of the air blowing unit or the air intake unit.

In addition, the composite material includes core material, but the composite material may also not include core material.

In addition, the step for removing the powdered adhesive is carried out after the heating step of the powdered adhesive, but no limitation is imposed thereby; the heating step and the removal step may be carried out simultaneously, or the heating step may be carried out after the removal step.

In addition, in the second embodiment, the plate-shaped member may be provided with a through-hole that extends through in the lamination direction. In this case, the through-hole preferably has a shape that corresponds to the portion in which the airflow is to be generated (portion from which the adhesive is removed). It is thereby possible to generate the airflow in the lamination direction of the laminate via the through-hole.

The invention claimed is:

1. A manufacturing method for manufacturing a composite material having a reinforced base material, the manufacturing method comprising:
   applying an unactivated powdered adhesive to at least one surface of a plurality of reinforced base material sheets;
   laminating the reinforced base material sheets with the unactivated powdered adhesive positioned between respective adjacent reinforced base material sheets to form a laminate;
   removing a portion of the unactivated powdered adhesive that is positioned between reinforced base material sheets of the laminate using an airflow that flows with respect to the laminate in a lamination direction of the reinforced base material sheets from one outer surface of the laminate to an oppositely facing outer surface of the laminate to form a first portion in which the unactivated powdered adhesive is applied positioned between the reinforced base material sheets of the laminate, and a second portion in which an applied density of the unactivated powdered adhesive is less than that in the first portion;
   activating the unactivated powdered adhesive into an activated adhesive; and
   forming a preform having a first region in which the activated adhesive is impregnated in the laminate and a second region in which a content density of the activated adhesive is less than that in the first region.

2. The manufacturing method according to claim 1, wherein
   the preform is formed in a three-dimensional shape, during the forming, in which a curvature of the second region is greater than a curvature of the first region during the forming of the preform.

3. The manufacturing method according to claim 1, further comprising
   placing the preform in a cavity inside a molding die, and injecting a resin into the cavity to impregnate the resin in the preform to mold the composite material such that
   a portion of the cavity in which the second region is disposed causes the resin injected into the cavity to flow more easily as compared to a portion of the cavity where the first region is disposed.

4. The manufacturing method according to claim 1, wherein
   a portion corresponding to the first portion of the laminate is clamped in the lamination direction during the removing of the unactivated powdered adhesive.

5. The manufacturing method according to claim 1, wherein
   the unactivated powdered adhesive that is applied to a portion that will become the first portion of the laminate is heated at least one of before or during the removing of the unactivated powdered adhesive.

6. The manufacturing method according to claim 1, further comprising
   sandwiching a plate-shaped member having a flow passage through which a gas can flow between the reinforced base material sheets of the laminate before the removing of the unactivated powdered adhesive, and
   supplying an auxiliary airflow that joins with the airflow via the flow passage of the plate-shaped member to a portion that will become the second portion of the laminate during the removing of the unactivated powdered adhesive.

7. The manufacturing method according to claim 1, further comprising
   cutting the laminate along a cutting line within the first region after the activating of the unactivated powdered adhesive and before the forming of the preform.

8. A manufacturing device for a composite material, the manufacturing device comprising:

an application unit configured to apply an unactivated powdered adhesive onto a plurality of reinforced base material sheets;

a lamination unit configured to laminate the plurality of reinforced base material sheets with the unactivated powdered adhesive positioned between respective adjacent reinforced base material sheets to form a laminate;

a removal unit configured to remove a portion of the unactivated powdered adhesive that is positioned between reinforced base material sheets of the laminate by applying an airflow that flows with respect to the laminate in a lamination direction of the laminate from one outer surface of the laminate to an oppositely facing outer surface of the laminate;

a heating unit configured to activate the unactivated powdered adhesive into an activated adhesive;

a preforming mold configured to perform the laminate into a predetermined shape; and a control unit configured to control operations of the removal unit and the heating unit, the control unit being configured to control an operation of the removal unit to remove the portion of the unactivated powdered adhesive that is positioned between the reinforced base material sheets of the laminate to thereby form a first portion in which the unactivated powdered adhesive is positioned between the layers of the laminate, and a second portion in which an applied density of the unactivated powdered adhesive is less than that in the first portion, and the operation of the heating unit to activate the unactivated powdered adhesive, and to form a preform having a first region in which the activated adhesive is impregnated in the laminate and a second region in which a content density of the activated adhesive is less than that in the first region.

9. The manufacturing device according to claim 8, wherein the preforming mold has a portion in which the second region is disposed that has a larger curvature than a portion in which the first region is disposed.

10. The manufacturing device according to claim 8, further comprising
a molding die having a cavity in which the preform is placed, wherein
a portion of the cavity in which the second region is disposed causes a resin injected into the cavity to flow more easily as compared to a portion of the cavity where the first region is disposed.

11. The manufacturing device according to claim 8, further comprising
a restraining fixture configured to sandwich and restrain in the lamination direction a portion of the laminate which will become the first portion.

12. The manufacturing device according to claim 11, further comprising
a fixture heating unit configured to heat the unactivated-_powdered adhesive that is applied to the portion that will become the first portion of the laminate by heating the restraining fixture.

13. The manufacturing device according to claim 8, further comprising
a plate-shaped member having a flow passage through which a gas can flow, wherein
the control unit is configured to control the operation of the removal unit and is configured to control a supply of an auxiliary airflow that joins with the airflow via the flow passage of the plate-shaped member to a portion that will become the second portion of the laminate.

14. The manufacturing device according to claim 8, further comprising
a cutting unit configured to cut the first region of the laminate along a cutting line.

* * * * *